US006091211A

United States Patent [19]
Koga et al.

[11] Patent Number: 6,091,211
[45] Date of Patent: Jul. 18, 2000

[54] MIS-CONVERGENCE CORRECTION DEVICE

[75] Inventors: Takasuke Koga; Naoki Hatakeyama, both of Ibaraki-ken, Japan

[73] Assignee: Victor Company of Japan, Ltd., Yokohama, Japan

[21] Appl. No.: 09/066,781

[22] Filed: Apr. 27, 1998

[30] Foreign Application Priority Data

Apr. 25, 1997 [JP] Japan .................................. 9-123030

[51] Int. Cl.[7] .............................. H01J 29/51; H02B 1/00; B65D 6/28; B65D 8/18; H01F 27/24

[52] U.S. Cl. .................. 315/368.28; 361/600; 220/4.02; 336/215; 336/92

[58] Field of Search ......................... 315/368.28, 368.25, 315/368.26; 73/855; 220/4.02; 361/600, 731; 505/883; 336/215, 92, 184

[56] References Cited

U.S. PATENT DOCUMENTS

| | | | |
|---|---|---|---|
| 4,588,930 | 5/1986 | Kobayashi et al. | 315/400 |
| 5,530,297 | 6/1996 | Rudy, Jr. et al. | 307/104 |

FOREIGN PATENT DOCUMENTS

| | | | |
|---|---|---|---|
| 5328371 | 12/1993 | Japan . | |
| 7023406 | 1/1995 | Japan . | |
| 2257339 | 1/1993 | United Kingdom | H04N 9/28 |

*Primary Examiner*—Seungsook Ham
*Assistant Examiner*—John Patti
*Attorney, Agent, or Firm*—Pollock, Vande Sande & Amernick

[57] ABSTRACT

A mis-convergence correction device includes a first controlled coil unit, a second controlled coil unit, a controlling coil unit, and a coil holder. The first controlled coil unit includes first and second drum cores and a first controlled coil. Each of the first and second drum cores has circular flanges at its opposite ends respectively. The first controlled coil is provided on a portion of the first drum core between its flanges and also a portion of the second drum core between its flanges. The second controlled coil unit includes third and fourth drum cores and a second controlled coil. Each of the third and fourth drum cores has circular flanges at its opposite ends respectively. The second controlled coil is provided on a portion of the third drum core between its flanges and also a portion of the fourth drum core between its flanges. The controlling coil unit is located between the first and second controlled coil units. The coil holder accommodates the first and second controlled coil units and the controlling coil unit. The coil holder has first and second halves. The first half has a hold portion for each of the flanges of the first, second, third, and fourth drum cores. The hold portion has first and second inclined surfaces being non-parallel to each other. The first inclined surface contacts the related flange only at a first point as viewed in a cross-section of the related flange. The second inclined surface contacts the related flange only at a second point as viewed in the cross-section of the related flange. The first and second points are separate from each other.

7 Claims, 12 Drawing Sheets

MIS-CONVERGENCE CORRECTION DEVICE

BACKGROUND OF THE INVENTION

1. Field of the Invention

This invention relates to a mis-convergence correction device for a color picture display tube using three electron beams. The mis-convergence correction device of this invention is connected to a deflection yoke of the color picture display tube when being used.

2. Description of the Related Art

In color picture display tubes using three electron beams, convergence means the condition in which the electron beams intersect at a specified point on a fluorescent screen. The color picture display tubes tend to have pincushion distortion which contracts a central area of the raster in upward and downward directions.

Some advanced deflection yokes of color picture display tubes are designed as precision convergence systems (PCS) which provide desired convergence and also suitably correct pincushion distortion.

The PCS deflection yoke positively distorts the distribution of generated magnetic field in the related color picture display tube so that the electron beams can accurately focus on a point of the screen. Thus, the PCS deflection yoke implements self-convergence.

The PCS deflection yoke is provided with a mis-convergence correction device connected to a pair of horizontal deflection coils. The horizontal deflection coils generate horizontal deflection magnetic fields, respectively. The mis-convergence correction device repetitively and differentially changes the horizontal magnetic fields at a vertical deflection period, thereby correcting mis-convergence along horizontal lines in upper and lower sides of the raster.

Japanese published unexamined patent application 5-328371 discloses a mis-convergence correction device which has a first controlled coil unit, a second controlled coil unit, and a controlling coil unit. The first controlled coil unit includes two drum cores formed with circular flanges at their ends. In the first controlled coil unit, two windings are provided on the drum cores respectively, and are connected in series to form a first controlled coil. The second controlled coil unit includes two drum cores formed with circular flanges at their ends. In the second controlled coil unit, two windings are provided on the drum cores respectively, and are connected in series to form a second controlled coil. The controlling coil unit includes a drum core formed with circular flanges at its ends. The controlling coil unit also includes a controlling coil provided on the drum core.

In the mis-convergence correction device of Japanese application 5-328371, the controlling coil unit is located between the first and second controlled coil units. The first and second controlled coils are connected to first and second horizontal deflection coils, respectively. The controlling coil is connected to a vertical deflection coil.

Japanese published unexamined patent application 7-23406 discloses a mis-convergence correction device which is similar to that of Japanese application 5-328371 except for the following point. In the mis-convergence correction device of Japanese application 7-23406, first and second controlled coil units, and a controlling coil unit are disposed in a casing composed of two halves.

A prior-art mis-convergence correction device which will be explained later has the following problems. The inductances of coils tend to vary from device to device. During assembly, adhesive is used. The use of the adhesive reduces the efficiency of assembly work.

SUMMARY OF THE INVENTION

It is an object of this invention to provide an improved mis-convergence correction device.

A first aspect of this invention provides a mis-convergence correction device comprising a first controlled coil unit including first and second drum cores and first and second windings, the first drum core having circular flanges at its opposite ends respectively, the second drum core having circular flanges at its opposite ends respectively, the first winding being provided on a portion of the first drum core between its flanges, the second winding being provided on a portion of the second drum core between its flanges, the first and second windings being connected to form a first controlled coil; a second controlled coil unit including third and fourth drum cores and third and fourth windings, the third drum core having circular flanges at its opposite ends respectively, the fourth drum core having circular flanges at its opposite ends respectively, the third winding being provided on a portion of the third drum core between its flanges, the fourth winding being provided on a portion of the fourth drum core between its flanges, the third and fourth windings being connected to form a second controlled coil; a controlling coil unit located between the first and second controlled coil units, the controlling coil unit including a fifth drum core and a controlling coil, the fifth drum core having circular flanges at its opposite ends respectively, the controlling coil being provided on a portion of the fifth drum core between its flanges; and a coil holder accommodating the first and second controlled coil units and the controlling coil unit, the coil holder having first and second halves, the first half having a hold portion for each of the flanges of the first, second, third, and fourth drum cores, the hold portion having first and second inclined surfaces being non-parallel to each other, the first inclined surface contacting the related flange only at a first point as viewed in a cross-section of the related flange, the second inclined surface contacting the related flange only at a second point as viewed in the cross-section of the related flange, the first and second points being separate from each other.

A second aspect of this invention is based on the first aspect thereof, and provides a mis-convergence correction device wherein the second half has a surface for each of the flanges of the first, second, third, and fourth drum cores, and the surface of the second half contacts the related flange only at a single point as viewed in the cross-section of the related flange.

A third aspect of this invention is based on the first aspect thereof, and provides a mis-convergence correction device wherein an assumed straight line perpendicular to the first inclined surface and passing through the first point, and an assumed straight line perpendicular to the second inclined surface and passing through the second point intersect with each other at a center of the related flange.

A fourth aspect of this invention is based on the first aspect thereof, and provides a mis-convergence correction device wherein the first half has a second hold portion for each of the flanges of the fifth drum core, the second hold portion having third and fourth inclined surfaces being non-parallel to each other, the third inclined surface contacting the related flange only at a third point as viewed in a cross-section of the related flange, the fourth inclined surface contacting the related flange only at a fourth point as viewed in the cross-section of the related flange, the third and fourth points being separate from each other.

A fifth aspect of this invention provides a mis-convergence correction device comprising a core having a flange; a coil provided on a portion of the core except the flange; and a casing accommodating the core and the coil, the casing having first and second flat surfaces being non-parallel to each other, the first and second flat surfaces contacting the flange to support the core.

A sixth aspect of this invention is based on the fifth aspect thereof, and provides a mis-convergence correction device wherein a combination of the core and the first and second flat surfaces is symmetrical with respect to an assumed plane passing through a center of the flange.

A seventh aspect of this invention provides a mis-convergence correction device comprising a first controlled coil unit including at least a first drum core and at least a first winding, the first drum core having circular flanges at its opposite ends respectively, the first winding being provided on a portion of the first drum core between its flanges; a second controlled coil unit including at least a second drum core and at least a second winding, the second drum core having circular flanges at its opposite ends respectively, the second winding being provided on a portion of the second drum core between its flanges; a controlling coil unit located between the first and second controlled coil units, the controlling coil unit including a third drum core and a controlling coil, the third drum core having circular flanges at its opposite ends respectively, the controlling coil being provided on a portion of the third drum core between its flanges; and a coil holder accommodating the first and second controlled coil units and the controlling coil unit, the coil holder having first and second halves, the first half having a hold portion for each of the flanges of the first and second drum cores, the hold portion having first and second inclined surfaces being non-parallel to each other, the first inclined surface contacting the related flange only at a first point as viewed in a cross-section of the related flange, the second inclined surface contacting the related flange only at a second point as viewed in the cross-section of the related flange, the first and second points being separate from each other.

DESCRIPTION OF THE PREFERRED EMBODIMENTS

A prior-art mis-convergence correction device will be explained hereinafter for a better understanding of this invention.

Figure 1:
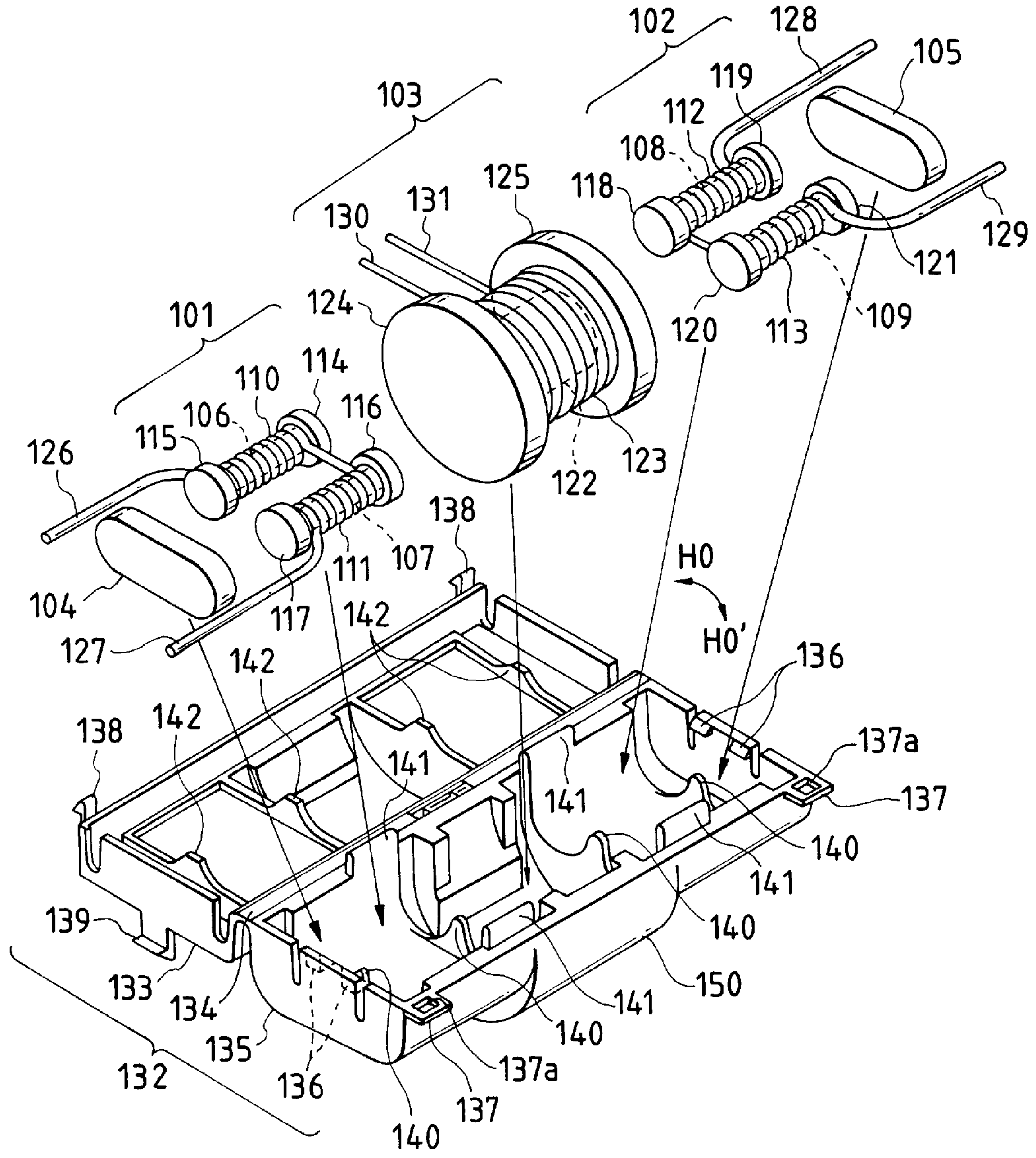
FIG. 1 PRIOR ART
FIG. 1 is a perspective exploded view of a prior-art mis-convergence correction device.

FIG. 1 shows a prior-art mis-convergence correction device which includes controlled coil units 101 and 102, a controlling coil unit 103, permanent magnets 104 and 105, and a coil holder 132. The coil holder 132 forms a casing which accommodates the controlled coil units 101 and 102, the controlling coil unit 103, and the permanent magnets 104 and 105.

In the prior-art mis-convergence correction device of FIG. 1, the controlled coil unit 101 has a pair of drum cores 106 and 107, and windings 110 and 111. The drum cores 106 and 107 are made of, for example, ferrite. The drum cores 106 and 107 are placed in parallel with each other. The windings 110 and 111 are provided on the drum cores 106 and 107, respectively. The windings 110 and 111 are connected in series to form a first controlled coil. The drum core 106 has circular or annular flanges 114 and 115 at its ends respectively. The drum core 107 has circular or annular flanges 116 and 117 at its ends respectively. A lead 126 extends from an end of the winding 110. A lead 127 extends from an end of the winding 111.

Similarly, the controlled coil unit 102 has a pair of drum cores 108 and 109, and windings 112 and 113. The drum cores 108 and 109 are made of, for example, ferrite. The drum cores 108 and 109 are placed in parallel with each other. The windings 112 and 113 are provided on the drum cores 108 and 109, respectively. The windings 112 and 113 are connected in series to form a second controlled coil. The drum core 108 has circular or annular flanges 118 and 119 at its ends respectively. The drum core 109 has circular or annular flanges 120 and 121 at its ends respectively. A lead 128 extends from an end of the winding 112. A lead 129 extends from an end of the winding 113.

The controlling coil unit 103 has a drum core 122, and a controlling coil 123 provided on the drum core 122. The drum core 122 is made of, for example, ferrite. The drum core 122 has circular or annular flanges 124 and 125 at its ends respectively. Leads 130 and 131 extend from ends of the controlling coil 123, respectively. The controlling coil unit 103 is held between the controlled coil units 101 and 102.

In the prior-art mis-convergence correction device of FIG. 1, each of the permanent magnets 104 and 105 has a plate-like shape with a uniform thickness. Each of the permanent magnets 104 and 105 is magnetized in a direction along the thickness thereof. The permanent magnet 104 is connected to an end of the controlled coil unit 101 which is remote from the controlling coil unit 103. The direction of the thickness of the permanent magnet 104 is parallel with the axial directions of the drum cores 106 and 107. The permanent magnet 104 covers the outer end surfaces of the flanges 115 and 117 of the drum cores 106 and 107. The permanent magnet 104 applies a magnetic bias to the controlled coil unit 101. The permanent magnet 105 is connected to an end of the controlled coil unit 102 which is remote from the controlling coil unit 103. The direction of the thickness of the permanent magnet 105 is parallel with the axial directions of the drum cores 108 and 109. The permanent magnet 105 covers the outer end surfaces of the flanges 119 and 121 of the drum cores 108 and 109. The permanent magnet 105 applies a magnetic bias to the controlled coil unit 102.

The coil holder 132 has a box-like shape. The coil holder 132 accommodates the controlled coil units 101 and 102, the controlling coil unit 103, and the permanent magnets 104 and 105. The coil holder 132 is divided into halves 133 and 135 connected by a hinge 134 having a thin wall. The hinge 134 allows the halves 133 and 135 to rotate relative to each other. The hinge 134 extends along adjacent sides of the halves 133 and 135. The half 133 can be rotated relative to the half 135 along directions H0 and H0' between a closed position and a fully open position. When the half 133 assumes the closed position, the corresponding wall surfaces of the halves 133 and 135 are in contact with each other. When the half 133 assumes the fully open position, the corresponding wall surfaces of the halves 133 and 135 are separate from each other so that the interiors thereof are exposed. During a former stage of assembly of the prior-art device, the half 135 is handled as a base into which the controlled coil units 101 and 102, the controlling coil unit 103, and the permanent magnets 104 and 105 are placed. The half 135 is referred to as the base half 135. On the other hand, the half 133 is handled as a lid for the base half 135. The half 133 is referred to as the lid half 133.

The coil holder 132 is made of elastic material such as polypropylene. The coil holder 132 is formed by, for example, a molding process.

In the prior-art mis-convergence correction device of FIG. 1, the base half 135 of the coil holder 132 has first and second ends which are spaced from each other along the longitudinal direction thereof. The inner surface of the wall of the first end of the base half 135 is formed with two projections 136. Similarly, the inner surface of the wall of the second end of the base half 135 is formed with two projections 136. When the controlled coil units 101 and 102, the controlling coil unit 103, and the permanent magnets 104 and 105 are placed into the base half 135, the projections 136 press the permanent magnets 104 and 105 inward so that the parts 101, 102, 103, 104, and 105 are brought into close contact.

A side of the base half 135 of the coil holder 132 which is remote from the hinge 134 has ends spaced from each other along the longitudinal direction thereof. The ends of the side of the base half 135 are formed with outward projections 137, respectively. The projections 137 have holes 137*a*, respectively. A side of the lid half 133 of the coil holder 132 which is remote from the hinge 134 has ends spaced from each other along the longitudinal direction thereof. The ends of the side of the lid half 133 are formed with claws 138 which can move into the holes 137*a* and thereby engage the projections 137 of the base half 135, respectively. Claws 139 are formed on respective ends of the lid half 133 which are spaced from each other along the longitudinal direction thereof. The claws 139 serve to mount the prior-art device on a base board (not shown).

In the prior-art mis-convergence correction device of FIG. 1, each of opposite side walls of the base half 135 of the coil holder 132 has a pair of upward projections 141. A bottom wall of the base half 135 has four projections 140 which are spaced along the longitudinal direction thereof. The projections 140 are centered at the bottom wall of the base half 135 as viewed in the widthwise direction thereof. Portions of the bottom wall of the base half 135 have circularly arcuate surfaces extending between the side walls and the projections 140 along the widthwise direction.

The inner surfaces of the lid half 133 of the coil holder 132 are formed with four projections 142 which are spaced along the longitudinal direction thereof. When the lid half 133 is rotated to its closed position, the projections 142 on the lid half 133 contact the projections 140 on the base half 135 respectively. As will be explained later, the positions of the controlled coil units 101 and 102 are limited by the projections 140, 141, and 142 when the lid half 133 is in its closed position relative to the base half 135. A central portion of the coil holder 132, which is defined as viewed along the longitudinal direction thereof, forms a cylindrical portion 150 accommodating the controlling coil unit 103.

Figure 2:
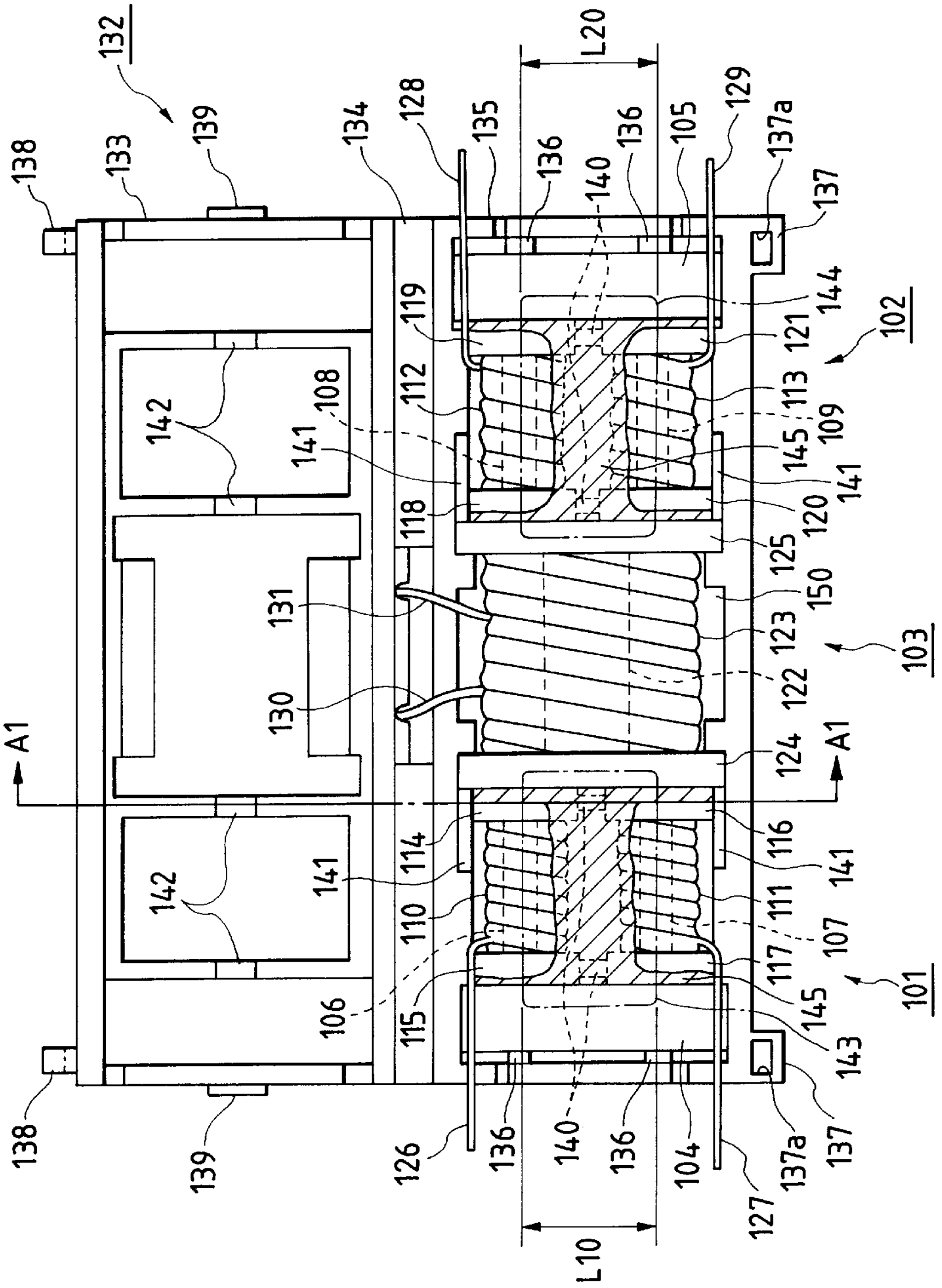
FIG. 2 PRIOR ART
FIG. 2 is a plan view of the prior-art mis-convergence correction device which is in a condition where a lid half of a coil holder assumes a fully open position relative to a base half of the coil holder.

FIG. 2 shows a condition in which the lid half 133 of the coil holder 132 is in its fully open position, and the controlled coil units 101 and 102, the controlling coil unit 103, and the permanent magnets 104 and 105 are placed in positions with respect to the base half 135 of the coil holder 132.

During assembly of the prior-art device, after the controlled coil units 101 and 102, the controlling coil unit 103, and the permanent magnets 104 and 105 are placed into the base half 135 of the coil holder 132, adhesive 145 is applied to portions of the surfaces of the controlled coil units 101 and 102.

In FIG. 2, the axes of the drum cores 106 and 107 are separate from each other by a distance L10. On the other hand, the axes of the drum cores 108 and 109 are separate from each other by a distance L20. When a current is driven through the controlled coil in the unit 101, there occurs a closed-loop magnetic path 143. When a current is driven through the controlled coil in the unit 102, there occurs a closed-loop magnetic path 144.

Figure 3:
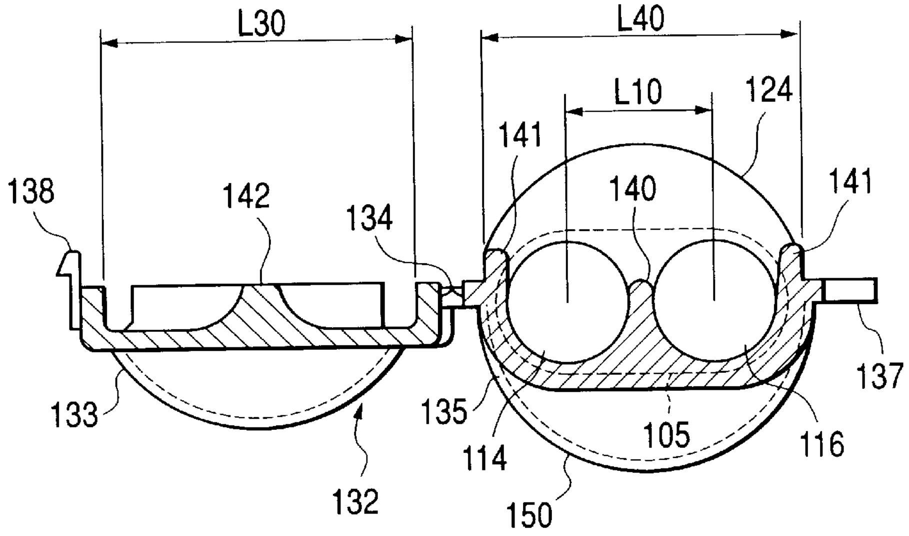
FIG. 3 PRIOR ART
FIG. 3 is a sectional view taken along the line A1—A1 of FIG. 2.

With reference to FIG. 3, the inner surfaces of the side walls of the lid half 133 of the coil holder 132 are separate from each other by an interval L30. The outer side surfaces of the projections 141 on the base half 135 of the coil holder 132 are separate from each other by an interval L40. The interval L30 is set slightly greater than the interval L40. As the lid half 133 is rotated from the fully open position in FIG. 3 to a partially open position in FIG. 4, the projections 141 on one side of the base half 135 relatively move into the lid half 133 without crashing against the side wall of the lid half 133. As the lid half 133 is rotated from the partially open position in FIG. 4 to the closed position in FIG. 5, the projections 141 on the other side of the base half 135 relatively move into the lid half 133 without crashing against the side wall of the lid half 133.

Figure 5:
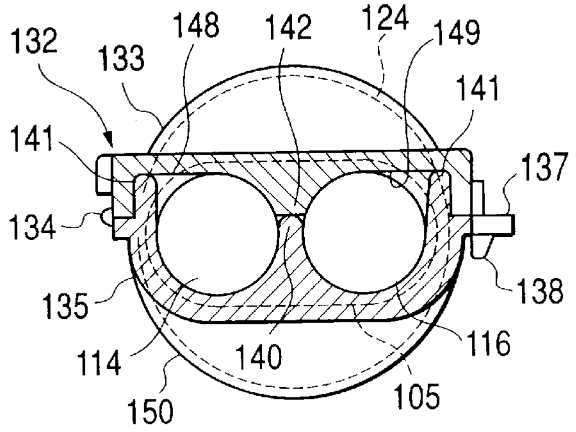
FIG. 5 PRIOR ART
FIG. 5 is a sectional view, corresponding to FIG. 3, of the prior-art mis-convergence correction device which is in a condition where the lid half of the coil holder assumes a closed position relative to the base half of the coil holder.

When the lid half 133 is in its closed position relative to the base half 135 as shown in FIG. 5, the lid half 133 and the base half 135 form two approximately circular portions 148 and 149 which accommodate the coil-provided drum cores 106 and 107 (the flanges 114, 115, 116, and 117 of the drum cores 106 and 107) respectively. In addition, the lid half 133 and the base half 135 form two approximately circular portions 148 and 149 which accommodate the coil-provided drum cores 108 and 109 (the flanges 118, 119, 120, and 121 of the drum cores 108 and 109) respectively. The flanges 114–121 of the drum cores 106–109 are located by the projections 140, 141, and 142. The controlling coil unit 103 is accommodated in the cylindrical portion 150 of the coil holder 132 which extends between the spaces occupied by the controlled coil units 101 and 102.

As previously explained, the prior-art mis-convergence correction device of FIGS. 1–5 includes the coil holder 132 which is divided into the lid half 133 and the base half 135. The base half 135 has the projections 140 and 141. The lid half 133 has the projections 142. During assembly of the prior-art device, the controlled coil units 101 and 102, the controlling coil unit 103, and the permanent magnets 104 and 105 are placed into the base half 135. Then, the adhesive 145 is applied to the portions of the surfaces of the controlled coil units 101 and 102. Before the adhesive 145 dries, the lid half 133 is rotated to its closed position relative to the base half 135 by use of the hinge 134. Thus, the controlled coil units 101 and 102, the controlling coil unit 103, and the permanent magnets 104 and 105 are placed in the coil holder 132. Then, the adhesive 145 dries. The controlled coil units 101 and 102, the controlling coil unit 103, and the permanent magnets 104 and 105 are retained with respect to the coil holder 132 by the adhesive 145 and the projections 140, 141, and 142.

The characteristics of the prior-art mis-convergence correction device of FIGS. 1–5 depend on the positive relation among the controlled coil units 101 and 102, the controlling coil unit 103, and the permanent magnets 104 and 105. Specifically, the inductances of the controlled coils in the units 101 and 102, and the inductance of the controlling coil in the unit 103 depend on the above-mentioned positive relation. Accordingly, the projections 140, 141, and 142 on the lid half 133 and the base half 135 of the coil holder 132 are designed to provide a suitable positional relation among the controlled coil units 101 and 102, the controlling coil unit 103, and the permanent magnets 104 and 105.

The inductances of the controlled coils in the units 101 and 102 are similar to each other. For example, the inductance L of the controlled coil in the unit 101 is given as follows.

$$L=\mu 0\cdot\mu S\cdot S\cdot n^2/L0 \qquad (1)$$

where "$\mu$0" denotes the space permeability; "$\mu$S" denotes the relative permeability of the drum cores 106 and 107; "S" denotes the cross-sectional area of the drum cores 106 and 107; "n" denotes the number of the turns of the windings 110 and 111; and "L0" denotes the length of the magnetic path 143.

With reference to FIG. 2, the length L0 of the magnetic path 143 depends on the distance L10 between the axes of the drum cores 106 and 107. Thus, as understood from the above-indicated equation (1), the inductance L of the controlled coil in the unit 101 depends on the distance L10 between the axes of the drum cores 106 and 107. Accordingly, to provide a desired inductance of the controlled coil in the unit 101, it is important to accurately set the distance L10 equal to a predetermined value. Similarly, to provide a desired inductance of the controlled coil in the unit 102, it is important to accurately set the distance L20 between the axes of the drum cores 108 and 109.

Figure 4:
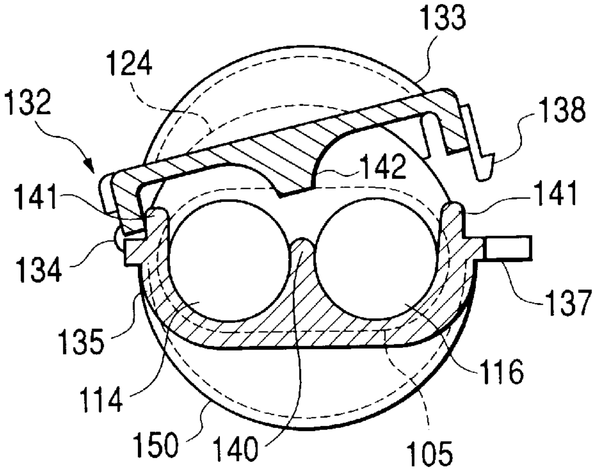
FIG. 4 PRIOR ART
FIG. 4 is a sectional view, corresponding to FIG. 3, of the prior-art mis-convergence correction device which is in a condition where the lid half of the coil holder assumes a partially open position relative to the base half of the coil holder.

As understood from FIGS. 3, 4, and 5, in the prior-art mis-convergence correction device, the distance L10 between the axes of the drum cores 106 and 107 and the distance L20 between the axes of the drum cores 108 and 109 are automatically determined as the flanges 114–121 of the drum cores 106–109 are located by the projections 140, 141, and 142 on the lid half 133 and the base half 135 of the coil holder 132.

Figure 6:
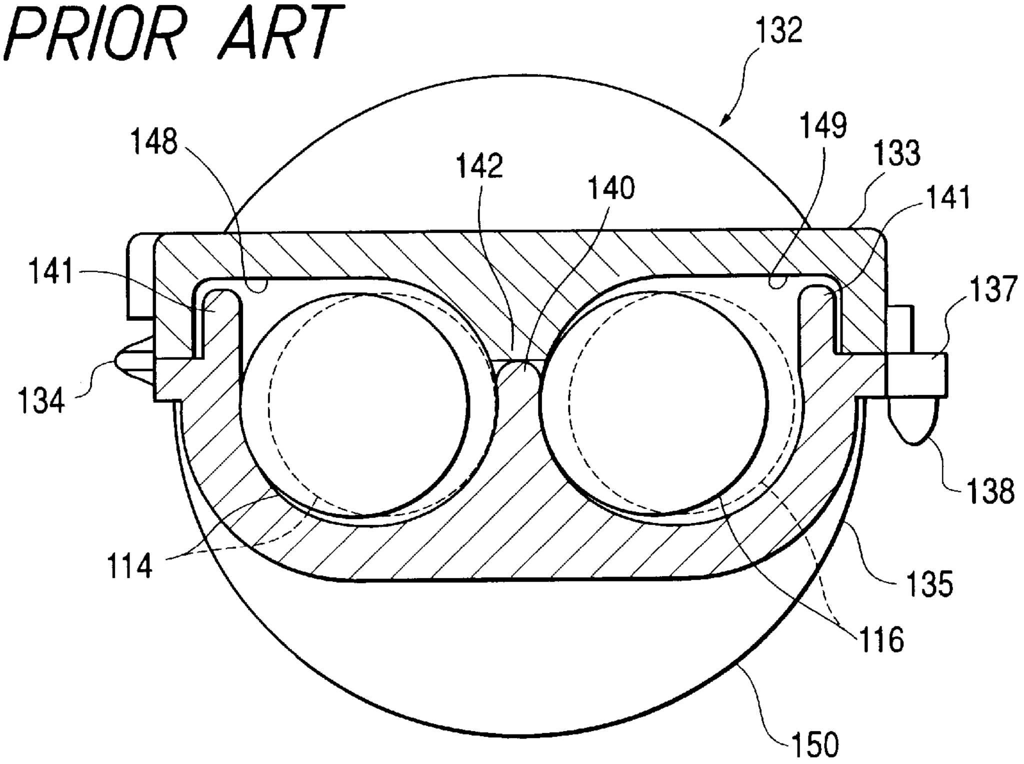
FIG. 6 PRIOR ART
FIG. 6 is a sectional view of the prior-art mis-convergence correction device.
Figure 7:
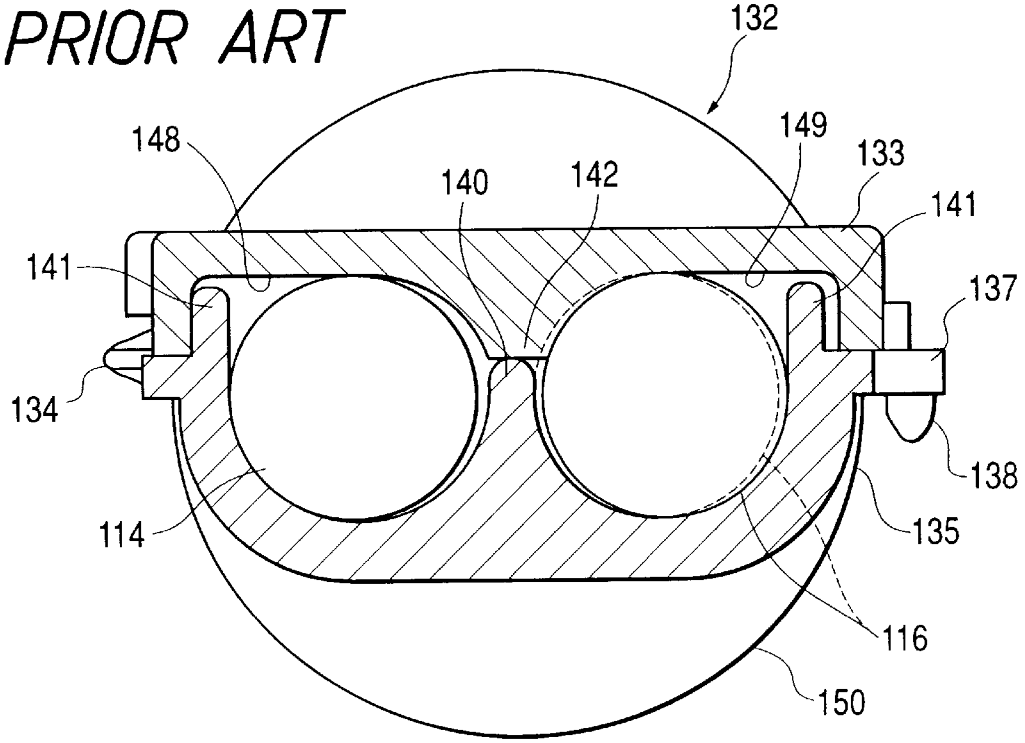
FIG. 7 PRIOR ART
FIG. 7 is a sectional view of the prior-art mis-convergence correction device.

In the prior-art mis-convergence correction device of FIGS. 1–5, the diameter of the circular portions 148 and 149 in the coil retainer 132 is slightly greater than the diameter of the flanges 114–121 of the drum cores 106–109 so that the flanges 114–121 can be easily and smoothly placed in the circular portions 148 and 149. Thus, as shown in FIG. 6, the flanges 114 and 116 of the drum cores 106 and 107 can move in the circular portions 148 and 149 in directions perpendicular to the axes of the drum cores 106 and 107. In some cases, as shown in FIG. 7, the lid half 133 shifts relative to the base half 135 along the widthwise direction so that projection 142 on the lid half 133 moves the flange 116 of the drum core 107 rightward out of the desired position. Thus, the distance L10 between the axes of the drum cores 106 and 107 tends to vary from device to device. Similarly, the distance L20 between the axes of the drum cores 108 and 109 tends to vary from device to device. Therefore, the inductances of the controlled coils in the units 101 and 102 tend to vary from device to device.

During assembly of the prior-art mis-convergence correction device of FIGS. 1–7, the adhesive 145 is applied to the portions of the surfaces of the controlled coil units 101 and 102. The adhesive 145 serves to locate the controlled coil units 101 and 102. In addition, the adhesive 145 serves to prevent the controlled coil units 101 and 102 from vibrating and generating noise sound during the activation of the device. The adhesive 145 reduces the efficiency of device assembly work.

First Embodiment

Figure 8:
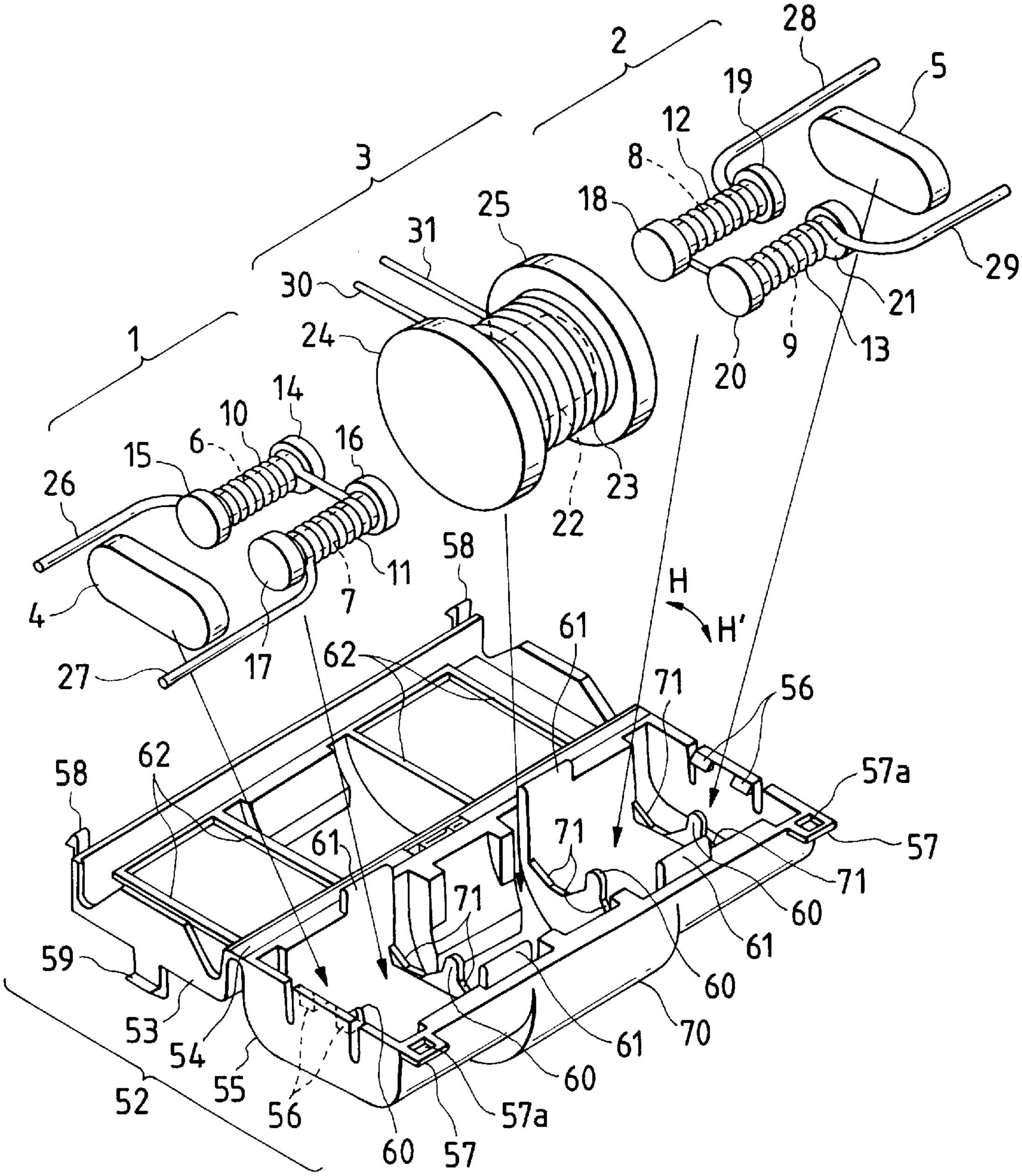
FIG. 8 is a perspective exploded view of a mis-convergence correction device according to a first embodiment of this invention.

FIG. 8 shows a mis-convergence correction device according to a first embodiment of this invention. The mis-convergence correction device of FIG. 8 includes controlled coil units 1 and 2, a controlling coil unit 3, permanent magnets 4 and 5, and a coil holder 52. The coil holder 52 forms a casing which accommodates the controlled coil units 1 and 2, the controlling coil unit 3, and the permanent magnets 4 and 5.

The controlled coil unit 1 has a pair of drum cores 6 and 7, and windings 10 and 11. The drum cores 6 and 7 are made of, for example, ferrite. The drum cores 6 and 7 are placed in parallel with each other. The windings 10 and 11 are provided on the drum cores 6 and 7, respectively. The windings 10 and 11 are connected in series to form a first controlled coil. The drum core 6 has circular or annular flanges 14 and 15 at its ends respectively. The winding 10 extends around the portion of the drum core 6 between the flanges 14 and 15. The drum core 7 has circular or annular flanges 16 and 17 at its ends respectively. The winding 11 extends around the portion of the drum core 7 between the flanges 16 and 17. A lead 26 extends from an end of the winding 10. A lead 27 extends from an end of the winding 11.

Similarly, the controlled coil unit 2 has a pair of drum cores 8 and 9, and windings 12 and 13. The drum cores 8 and 9 are made of, for example, ferrite. The drum cores 8 and 9 are placed in parallel with each other. The windings 12 and 13 are provided on the drum cores 8 and 9, respectively. The windings 12 and 13 are connected in series to form a second controlled coil. The drum core 8 has circular or annular flanges 18 and 19 at its ends respectively. The winding 12 extends around the portion of the drum core 8 between the flanges 18 and 19. The drum core 9 has circular or annular flanges 20 and 21 at its ends respectively. The winding 13 extends around the portion of the drum core 9 between the flanges 20 and 21. A lead 28 extends from an end of the winding 12. A lead 29 extends from an end of the winding 13.

The controlling coil unit 3 has a drum core 22, and a controlling coil 23 provided on the drum core 22. The drum core 22 is made of, for example, ferrite. The drum core 22 has circular or annular flanges 24 and 25 at its ends respectively. The controlling coil 23 extends around the drum core 22 between the flanges 24 and 25. Leads 30 and 31 extend from ends of the controlling coil 23, respectively. The controlling coil unit 3 is held between the controlled coil units 1 and 2.

Each of the permanent magnets 4 and 5 has a plate-like shape with a uniform thickness. Each of the permanent magnets 4 and 5 is magnetized in a direction along the thickness thereof. The permanent magnet 4 is connected to an end of the controlled coil unit 1 which is remote from the controlling coil unit 3. The direction of the thickness of the permanent magnet 4 is parallel with the axial directions of the drum cores 6 and 7. The permanent magnet 4 covers the outer end surfaces of the flanges 15 and 17 of the drum cores 6 and 7. The permanent magnet 4 applies a magnetic bias to the controlled coil unit 1. The permanent magnet 5 is connected to an end of the controlled coil unit 2 which is remote from the controlling coil unit 3. The direction of the thickness of the permanent magnet 5 is parallel with the axial directions of the drum cores 8 and 9. The permanent magnet 5 covers the outer end surfaces of the flanges 19 and 21 of the drum cores 8 and 9. The permanent magnet 5 applies a magnetic bias to the controlled coil unit 2.

The coil holder 52 has a box-like shape. The coil holder 52 accommodates the controlled coil units 1 and 2, the controlling coil unit 3, and the permanent magnets 4 and 5. The coil holder 52 is divided into halves 53 and 55 connected by a hinge 54 having a thin wall. The hinge 54 allows the halves 53 and 55 to rotate relative to each other. The hinge 54 extends along adjacent sides of the halves 53 and 55. The half 53 can be rotated relative to the half 55 along directions H and H' between a closed position and a fully open position. When the half 53 assumes the closed position, the corresponding wall surfaces of the halves 53 and 55 are in contact with each other. When the half 53 assumes the fully open position, the corresponding wall surfaces of the halves 53 and 55 are separate from each other so that the interiors thereof are exposed. During a former stage of assembly of the device, the half 55 is handled as a base into which the controlled coil units 1 and 2, the controlling coil unit 3, and the permanent magnets 4 and 5 are placed. The half 55 is referred to as the base half 55. On the other hand, the half 53 is handled as a lid for the base half 55. The half 53 is referred to as the lid half 53.

The coil holder 52 is made of elastic material such as polypropylene. The coil holder 52 is formed by, for example, a molding process.

The base half 55 of the coil holder 52 has first and second ends which are spaced from each other along the longitudinal direction thereof. The inner surface of the wall of the first end of the base half 55 is formed with two projections 56. Similarly, the inner surface of the wall of the second end of the base half 55 is formed with two projections 56. When the controlled coil units 1 and 2, the controlling coil unit 3, and the permanent magnets 4 and 5 are placed into the base half 55, the projections 56 press the permanent magnets 4 and 5 inward so that the parts 1, 2, 3, 4, and 5 are brought into close contact.

A side of the base half 55 of the coil holder 52 which is remote from the hinge 54 has ends spaced from each other along the longitudinal direction thereof. The ends of the side of the base half 55 are formed with outward projections 57, respectively. The projections 57 have holes 57*a*, respectively. A side of the lid half 53 of the coil holder 52 which is remote from the hinge 54 has ends spaced from each other along the longitudinal direction thereof. The ends of the side of the lid half 53 are formed with claws 58 which can move into the holes 57*a* and thereby engage the projections 57 of the base half 55, respectively. Claws 59 are formed on respective ends of the lid half 53 which are spaced from each other along the longitudinal direction thereof. The claws 59 serve to mount the device on a base board (not shown).

Each of opposite side walls of the base half 55 of the coil holder 52 has a pair of upward projections 61. A bottom wall of the base half 55 has four projections 60 which are spaced along the longitudinal direction thereof. The projections 60 are centered at the bottom wall of the base half 55 as viewed in the widthwise direction thereof. The bottom wall of the base half 55 has hold portions 71 for the respective flanges 14–21 of the drum cores 6–9. The hold portions 71 of the base half 55 extend between the side walls and the projections 60 along the widthwise direction of the base half 55.

The inner surfaces of the lid half 53 of the coil holder 52 are formed with straight line portions 62 which are spaced along the longitudinal direction of the lid half 53. The straight line portions 62 extend parallel to the widthwise direction of the lid half 53. The straight line portions 62 have flat surfaces. The straight line portions 62 of the lid half 53 correspond in position to the projections 60 on the base half 55. During assembly of the device, when the lid half 53 is rotated to its closed position, the straight line portions 62 on the lid half 53 contact and press the tops of the flanges 14–21 of the drum cores 6–9 in the base half 55. As will be made clear later, the positions of the controlled coil units 1 and 2 are limited by the projections 60 and 61 and the straight line portions 62 when the lid half 53 is in its closed position relative to the base half 55. A central portion of the coil holder 52, which is defined as viewed along the longitudinal direction thereof, forms a cylindrical portion 70 accommodating the controlling coil unit 3.

Figure 17:
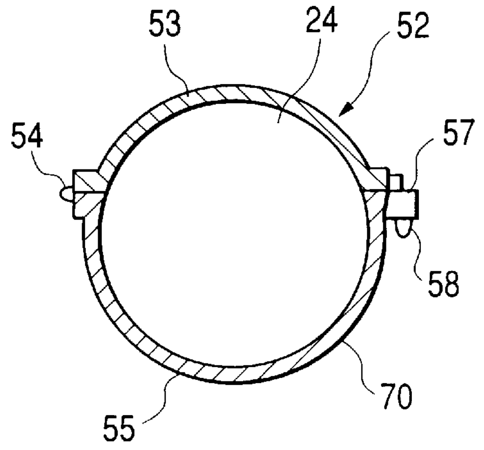
FIG. 17 is a sectional view taken along the line B2—B2 of FIG. 9 in a condition where the lid half of the coil holder is closed.

As shown in FIG. 17, the interior of the cylindrical portion 70 of the coil holder 52 conforms in cross section to the flange 24 (and the flange 25) of the drum core 22 in the controlling coil unit 3. The walls of the cylindrical portion 70 surround and firmly hold the flanges 24 and 25 of the drum core 22. Thus, the cylindrical portion 70 firmly retains the controlling coil unit 3 therein.

Figure 9:
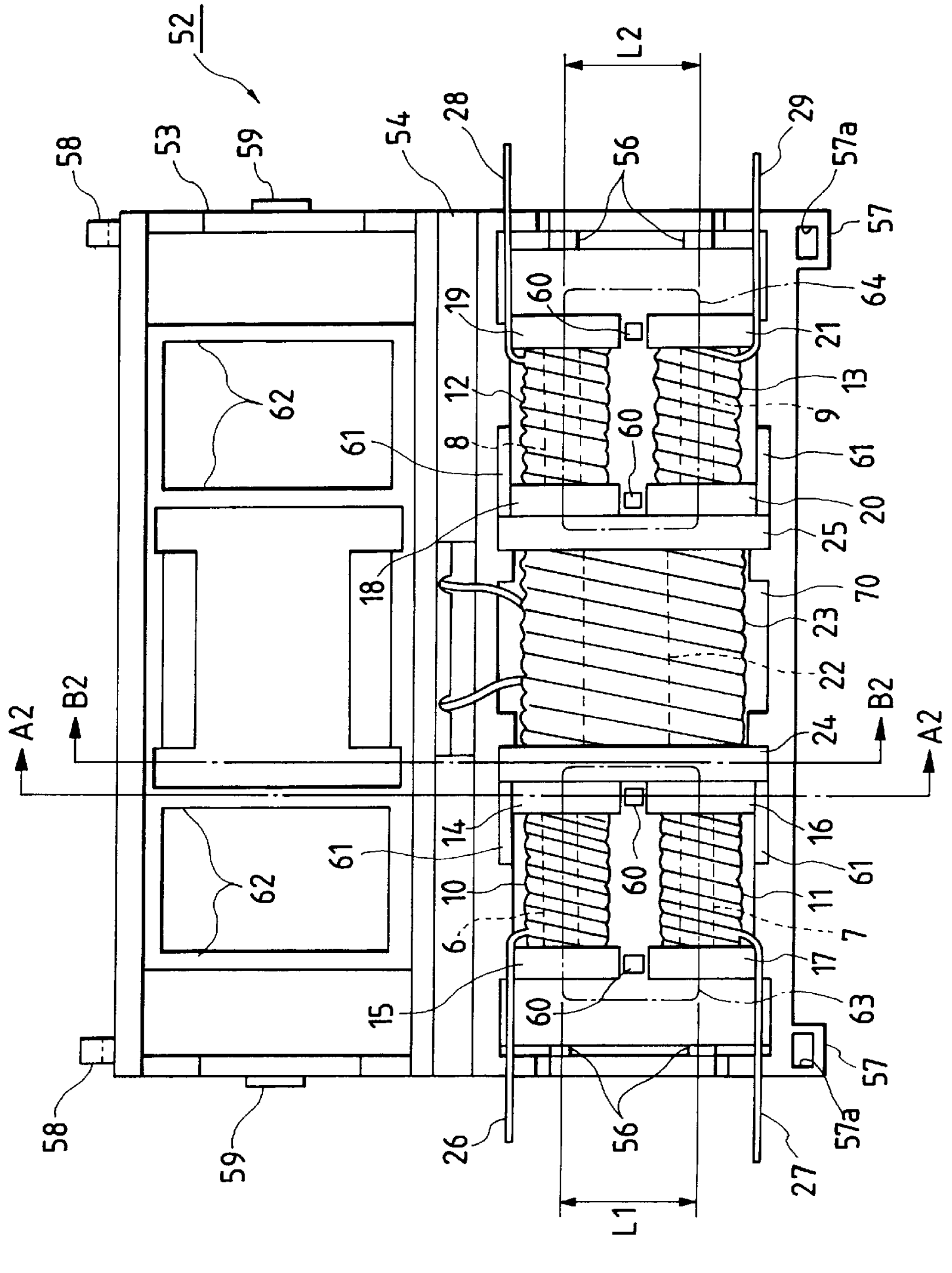
FIG. 9 is a plan view of the mis-convergence correction device of FIG. 8 which is in a condition where a lid half of a coil holder assumes a fully open position relative to a base half of the coil holder.

FIG. 9 shows a condition in which the lid half 53 of the coil holder 52 is in its fully open position, and the controlled coil units 1 and 2, the controlling coil unit 3, and the permanent magnets 4 and 5 are placed in positions with respect to the base half 53 of the coil holder 52.

In FIG. 9, the axes of the drum cores 6 and 7 are separate from each other by a distance L1. On the other hand, the axes of the drum cores 8 and 9 are separate from each other by a distance L2. When a current is driven through the controlled coil in the unit 1, there occurs a closed-loop magnetic path 63. When a current is driven through the controlled coil in the unit 2, there occurs a closed-loop magnetic path 64.

The hold portions 71 of the base half 55 are similar to each other. Among them, the hold portions 71 for the flanges 14 and 16 of the drum cores 6 and 7 will be explained in detail later.

Figure 10:
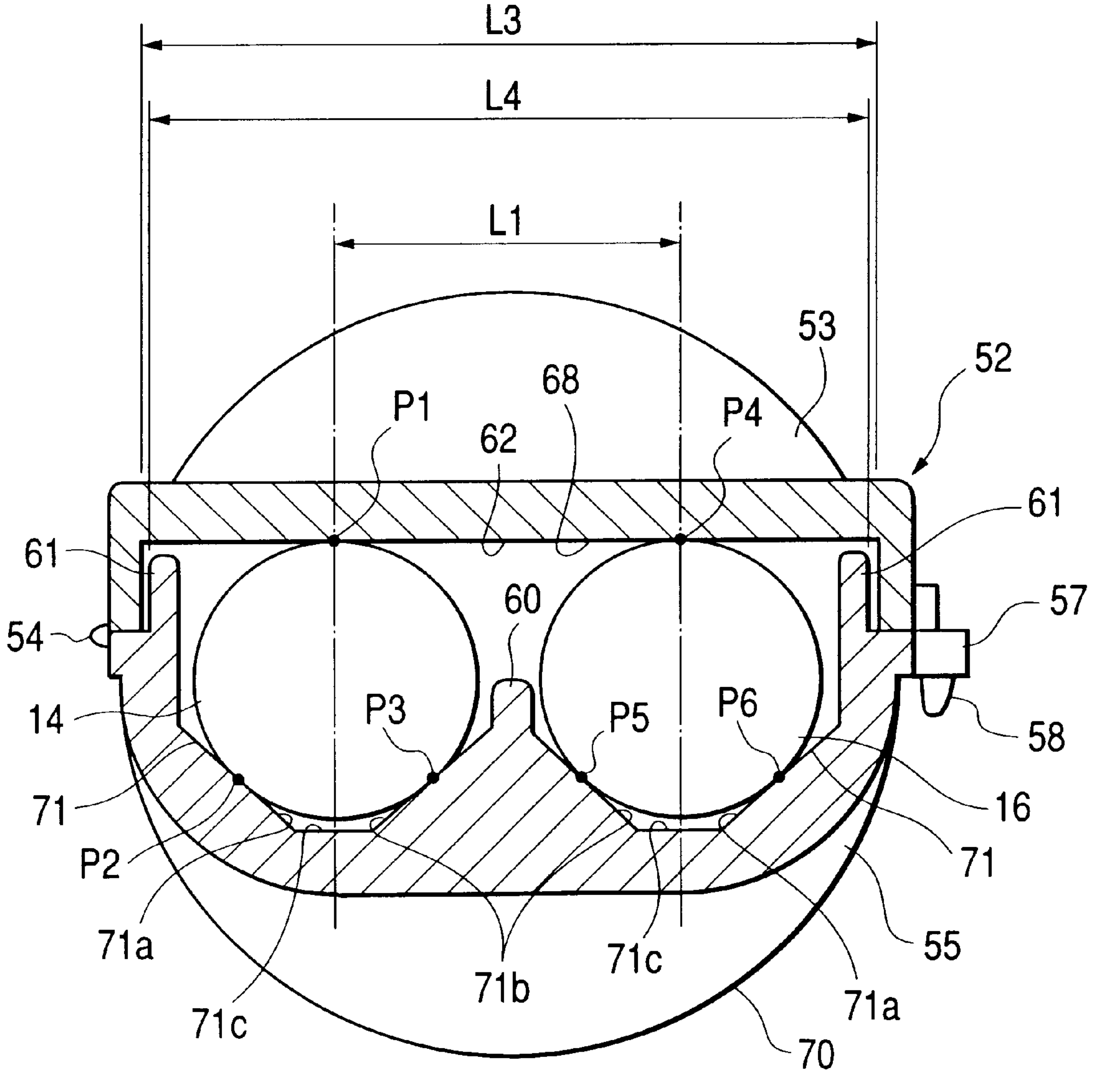
FIG. 10 is a sectional view taken along the line A2—A2 of FIG. 9 in a condition where the lid half of the coil holder is closed.

With reference to FIG. 10, the inner surfaces of the side walls of the lid half 53 of the coil holder 52 are separate from each other by an interval L3. The outer side surfaces of the projections 61 on the base half 55 of the coil holder 52 are separate from each other by an interval L4. The interval L3 is set slightly greater than the interval L4. As the lid half 53 is rotated to its closed position, the projections 61 on the base half 55 relatively move into the lid half 53 without crashing against the side walls of the lid half 53.

When the lid half 53 is in its closed position relative to the base half 55 as shown in FIG. 10, the lid half 53 and the base half 55 form spaces 68 which accommodate the controlled coil units 1 and 2 respectively. As previously mentioned, the bottom wall of the base half 55 has the hold portions 71 which extend between the side walls and the projections 60 along the widthwise direction of the base half 55. The flanges 14–21 of the drum cores 6–9 are placed on and supported by the hold portions 71 of the base half 55, respectively. The tops of the flanges 14–21 of the drum cores 6–9 are in contact with the straight line portions 62 of the lid half 53. Thus, the flanges 14–21 of the drum cores 6–9 are retained between the hold portions 71 of the base half 55 and the straight line portions 62 of the lid half 53.

With reference to FIG. 10, the hold portion 71 for the flange 14 of the drum core 6 has a first inclined flat surface 71*a*, a second inclined flat surface 71*b*, and a horizontal flat surface 71*c*. The first inclined flat surface 71*a* extends between the lower end of the side wall of the base half 55 and the horizontal flat surface 71*c*. The first inclined flat surface 71*a* is oblique with respect to the horizontal, and faces the flange 14 of the drum core 6. The second inclined flat surface 71*b* is non-parallel to the first inclined flat surface 71*a*. The second inclined flat surface 71*b* extends between the horizontal flat surface 71*c* and the projection 60 on the base half 55. The second inclined flat surface 71*b* is oblique with respect to the horizontal, and faces the flange 14 of the drum core 6. The horizontal flat surface 71*c* connects the first and second inclined flat surfaces 71*a* and 71*b*. The shape of the hold portion 71 for the flange 14 of the drum core 6 is symmetrical with respect to the vertical passing through the center of the horizontal flat surface 71*c*. Thus, the first and second inclined flat surfaces 71*a* and 71*b* are angularly separate from the previously-indicated vertical by equal angles along opposite directions, respectively. In other words, the angle of the second inclined flat surface 71*b* relative to the vertical is equal to that of the first inclined flat surface 71*a*.

Similarly, the hold portion 71 for the flange 16 of the drum core 7 has a first inclined flat surface 71*a*, a second inclined flat surface 71*b*, and a horizontal flat surface 71*c*. The first inclined flat surface 71*a* extends between the lower end of the side wall of the base half 55 and the horizontal flat surface 71*c*. The first inclined flat surface 71*a* is oblique with respect to the horizontal, and faces the flange 16 of the drum core 7. The second inclined flat surface 71*b* is non-parallel to the first inclined flat surface 71*a*. The second inclined flat surface 71*b* extends between the horizontal flat surface 71*c* and the projection 60 on the base half 55. The second inclined flat surface 71*b* is oblique with respect to the horizontal, and faces the flange 16 of the drum core 7. The horizontal flat surface 71*c* connects the first and second inclined flat surfaces 71*a* and 71*b*. The shape of the hold portion 71 for the flange 16 of the drum core 7 is symmetrical with respect to the vertical passing through the center of the horizontal flat surface 71*c*. Thus, the first and second inclined flat surfaces 71*a* and 71*b* are angularly separate from the previously-indicated vertical by equal angles along opposite directions, respectively. In other words, the angle of the second inclined flat surface 71*b* relative to the vertical is equal to that of the first inclined flat surface 71*a*.

In FIG. 10, regarding the hold portion 71 for the flange 14 of the drum core 6, the flange 14 contacts the straight line portion 62 of the lid half 53 at a point P1. In addition, the flange 14 contacts the first inclined flat surface 71*a* of the hold portion 71 at a point P2, and contacts the second inclined flat surface 71*b* of the hold portion 71 at a point P3. Thus, in FIG. 10, the flange 14 of the drum core 6 is supported at three points angularly separate from each other. Preferably, an assumed straight line perpendicular to the first inclined flat surface 71*a* and passing through the point P2, and an assumed straight line perpendicular to the second inclined flat surface 71*b* and passing through the point P3 intersect with each other at the center of the flange 14.

In FIG. 10, regarding the hold portion 71 for the flange 16 of the drum core 7, the flange 16 contacts the straight line portion 62 of the lid half 53 at a point P4. In addition, the flange 16 contacts the first inclined flat surface 71*a* of the hold portion 71 at a point P6, and contacts the second inclined flat surface 71*b* of the hold portion 71 at a point P5. Thus, in FIG. 10, the flange 16 of the drum core 7 is supported at three points angularly separate from each other. Preferably, an assumed straight line perpendicular to the first inclined flat surface 71*a* and passing through the point P6, and an assumed straight line perpendicular to the second inclined flat surface 71*b* and passing through the point P5 intersect with each other at the center of the flange 16.

Similarly, each of the other flanges 15, 17, 18, 19, 20, and 21 of the drum cores 6–9 is supported at three points angularly separate from each other as viewed in cross section. Thereby, the controlled coil units 1 and 2 are fixedly held in the spaces 68 within the coil retainer 52.

Figure 11:
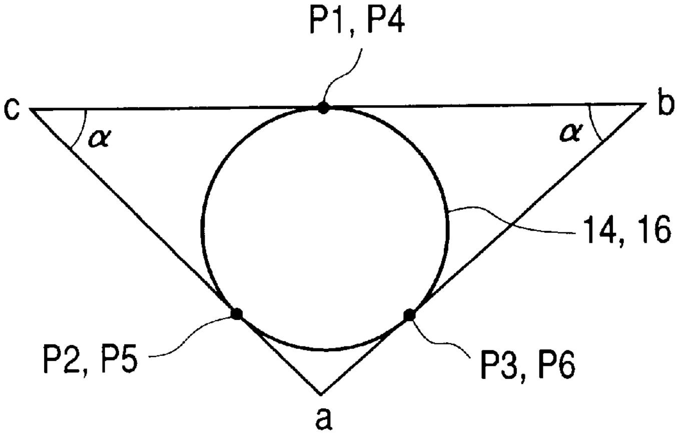
FIG. 11 is a diagram of assumed supports for flanges of drum cores in a controlled coil unit in the mis-convergence correction device of FIG. 8.

The above-mentioned supports for the flanges 14 and 16 of the drum cores 6 and 7 are equivalent to assumed supports which are illustrated in FIG. 11. With reference to FIG. 11, the sides "ab", "ac", and "bc" of the triangle "abc" correspond to the second inclined flat surface 71*b* (see FIG. 10) of the hold portion 71, the first inclined flat surface 71*a* (see FIG. 10) of the hold portion 71, and the straight line portion 62 (see FIG. 10) of the lid half 53, respectively. The sides "ab" and "ac" of the triangle "abc" are formed by extending the first and second inclined flat surfaces 71*a* and 71*b* of the hold portion 71. In FIG. 11, each of the flanges 14 and 16 of the drum cores 6 and 7 is supported by the triangle "abc". Since the flat surfaces 71*a* and 71*b* of the hold portion 71 have equal inclination angles, the triangle "abc" is isosceles. The angles "b" and "c" of the triangle "abc" are equal to a same value "α".

As understood from the previous explanation, the horizontal flat surfaces 71*c* of the hold portions 71 do not affect the positioning of the flanges 14–21 of the drum cores 6–9. Accordingly, the horizontal flat surfaces 71*c* of the hold portions 71 may be replaced by non-flat surfaces. Alternatively, the horizontal flat surfaces 71*c* of the hold portions 71 may be omitted. In this case, the hold portions 71 have V-shaped structures.

With reference to FIG. 11, as the diameters of the flanges 14 and 16 of the drum cores 6 and 7 vary, the centers of the flanges 14 and 16 of the drum cores 6 and 7 move only along the vertical passing through the point "a". In this case, the centers of the flanges 14 and 16 of the drum cores 6 and 7 do not move horizontally. Thus, the distance L1 between the axes of the drum cores 6 and 7 remains constant. Similarly, the distance L1 between the axes of the drum cores 6 and 7 remains unchanged even when the diameters of the flanges 15 and 17 vary. Also, the distance L2 between the axes of the drum cores 8 and 9 remains constant even when the diameters of the flanges 18, 19, 20, and 21 of the drum cores 8 and 9 vary.

Figure 12:
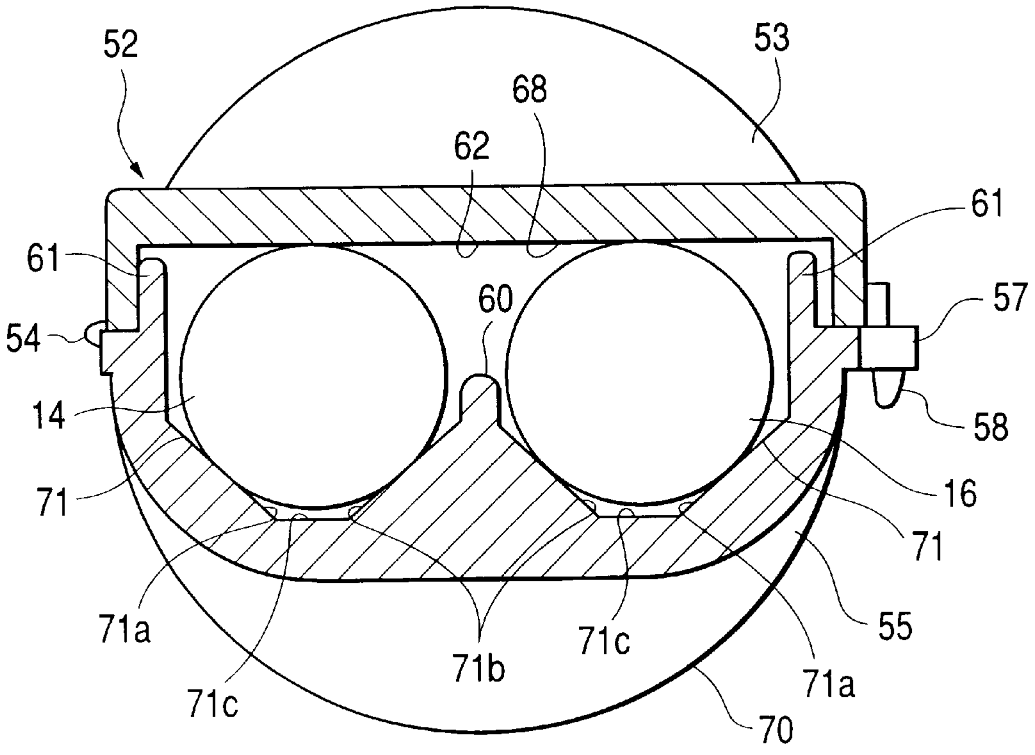
FIG. 12 is a sectional view of the mis-convergence correction device of FIG. 8.

It is assumed that as shown in FIG. 12, the lid half 53 shifts rightward relative to the base half 55 when assuming its closed position. The drum cores 6–9 remain at the desired positions relative to the base half 55 independent of the rightward shift of the lid half 53. Thus, the distance L1 between the axes of the drum cores 6 and 7, and the distance L2 between the axes of the drum cores 8 and 9 are held constant.

Preferably, the straight line portions 62 of the lid half 53 are designed so as to surely contact and press the tops of the flanges 14–21 of the drum cores 6–9 even in the presence of variations in the diameters of the flanges 14–21. In this case, the controlled coil units 1 and 2 which include the drum cores 6–9 are firmly retained in the spaces 68 within the coil holder 52 by the elasticity of the lid half 53.

As understood from the previous explanation, the inductances of the controlled coils in the units 1 and 2 less vary from device to device. It is unnecessary to use adhesive in assembly of the device. Thus, the number of steps of making the device of FIGS. 8–12 is smaller than that of steps of making the prior-art device of FIGS. 1–7. Since the controlled coil units 1 and 2 are firmly retained in the spaces 68 within the coil holder 52, it is possible to prevent the controlled coil units 1 and 2 from vibrating and generating noise sound during the activation of the device.

Preferably, the height of the projections 60 on the base half 55 of the coil retainer 52 is chosen to enable the positioning of the controlled coil units 1 and 2. The height of the projections 60 may be smaller than that of the corresponding projections 140 in the prior-art device of FIGS. 1–7. It should be noted that the projections 60 may be omitted from the base half 55 of the coil retainer 52. In this case, the controlled coil units 1 and 2 can be easily placed into the base half 55 of the coil retainer 52.

The straight line portions 62 of the lid half 53 of the coil retainer 52 may be replaced by non-straight line portions which press single upper points (preferably, top points) of the surfaces of the flanges 14–21 of the drum cores 6–9.

Experiments were carried out as follows. A plurality of samples of the mis-convergence correction device of FIGS. 8–12 were made. In addition, a plurality of samples of the mis-convergence correction device of FIGS. 1–7 were made. Regarding the samples of the mis-convergence correction device of FIGS. 8–12, measurements were given of the inductances of the controlled coils in the units 1 and 2. Also, regarding the samples of the mis-convergence correction device of FIGS. 1–7, measurements were given of the inductances of the controlled coils in the units 101 and 102.

Figure 19:
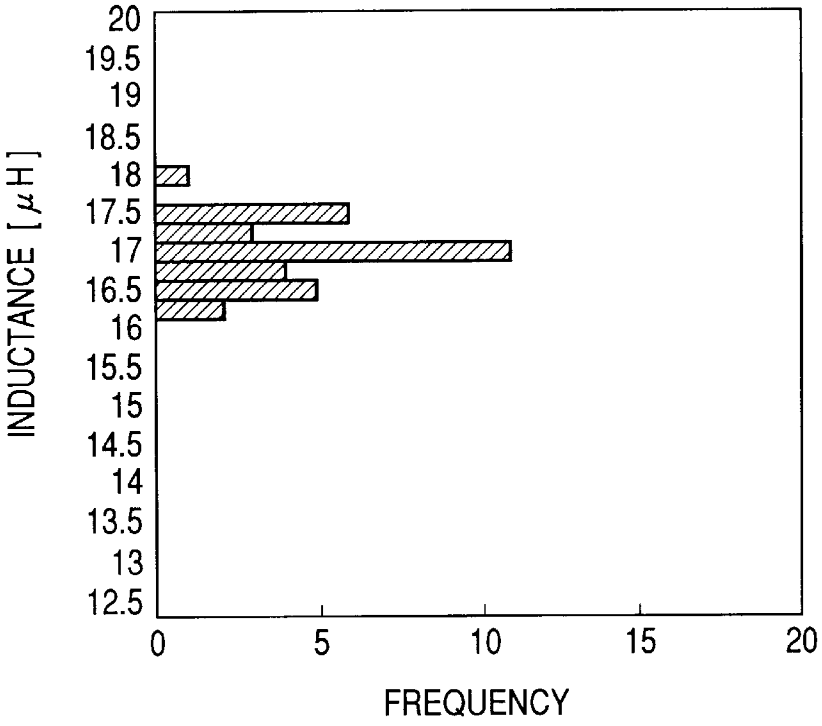
FIG. 19 is a diagram of a frequency distribution of measured inductances of controlled coils in samples of the mis-convergence correction device of FIG. 8.
Figure 20:
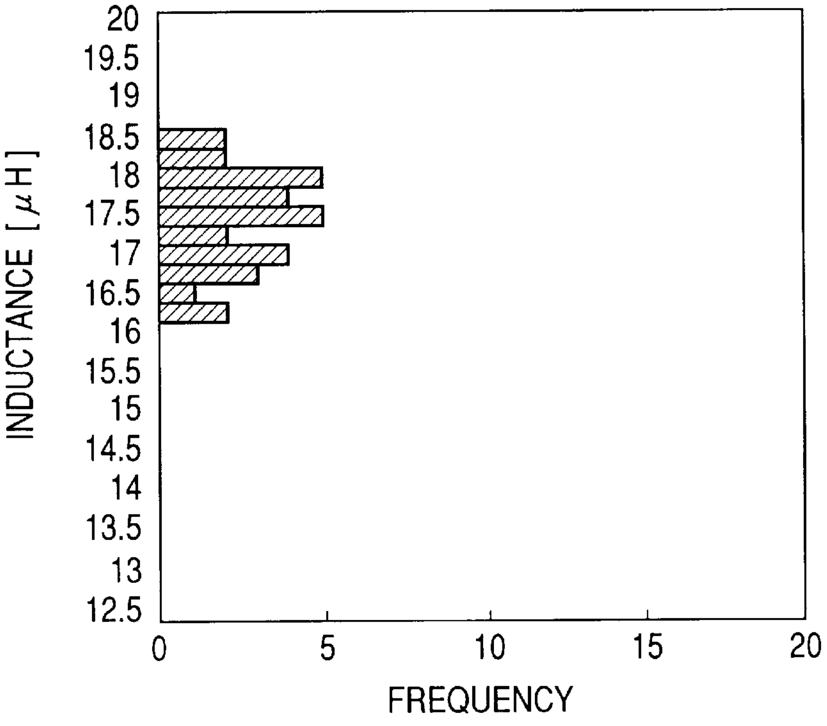
FIG. 20 PRIOR ART
FIG. 20 is a diagram of a frequency distribution of measured inductances of controlled coils in samples of the prior-art mis-convergence correction device of FIG. 1.

FIG. 19 shows a frequency distribution of the measured values of the inductances of the controlled coils in the units 1 and 2 in the samples of the mis-convergence correction device of FIGS. 8–12. FIG. 20 shows a frequency distribution of the measured values of the inductances of the controlled coils in the units 101 and 102 in the samples of the mis-convergence correction device of FIGS. 1–7. As understood from FIGS. 19 and 20, the inductances of the controlled coils in the units 1 and 2 in the samples of the mis-convergence correction device of FIGS. 8–12 less vary than the inductances of the controlled coils in the units 101 and 102 in the samples of the mis-convergence correction device of FIGS. 1–7.

Second Embodiment

Figure 13:
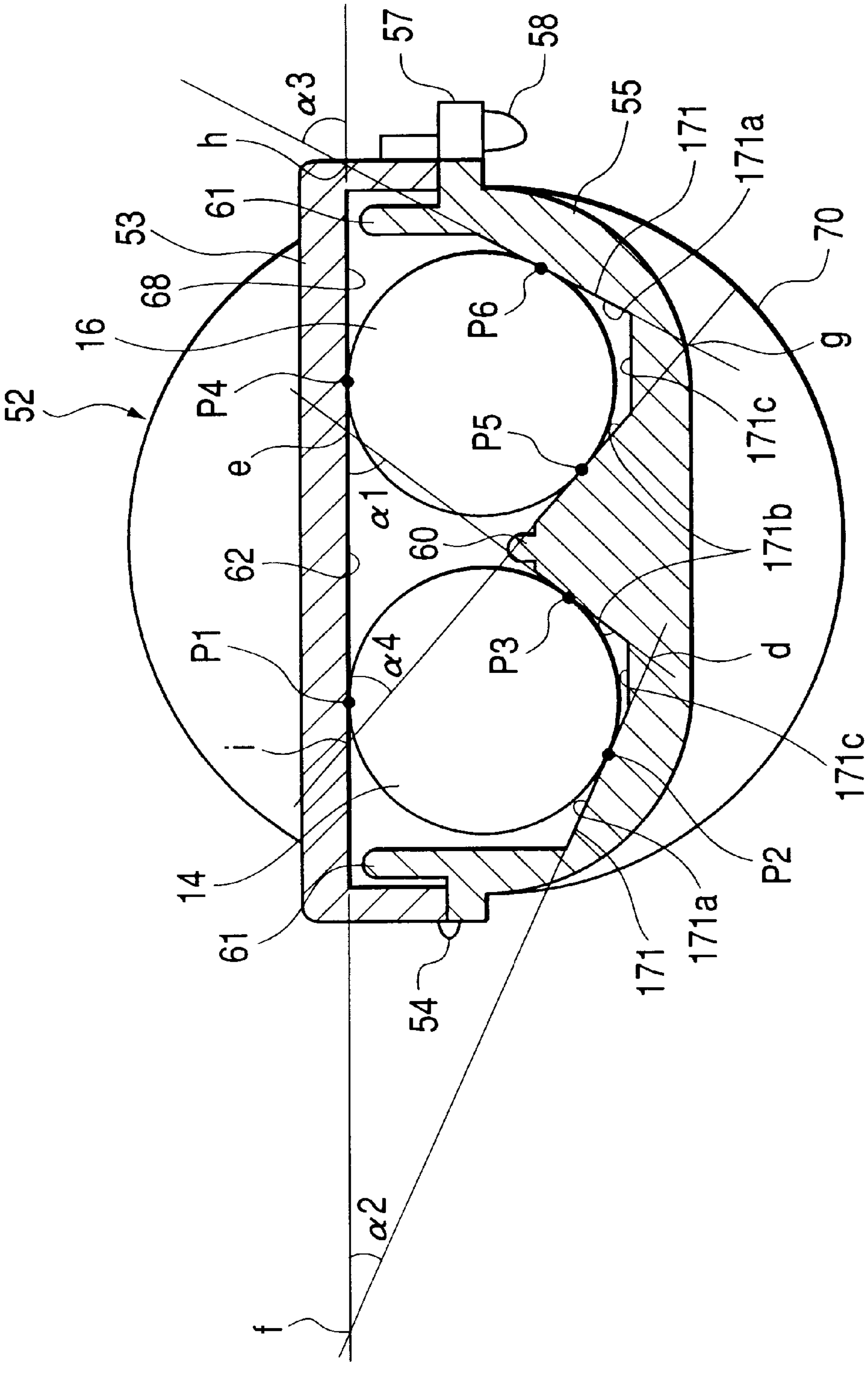
FIG. 13 is a sectional view of a mis-convergence correction device according to a second embodiment of this invention.

FIG. 13 shows a second embodiment of this invention which is similar to the embodiment of FIGS. 8–12 except that hold portions 171 replace the hold portions 71 of the base half 55 of the coil retainer 52.

As shown in FIG. 13, the hold portion 171 for the flange 14 of the drum core 6 has a first inclined flat surface 171*a*, a second inclined flat surface 171*b*, and a horizontal flat surface 171*c*. The first inclined flat surface 171*a* extends between the lower end of the side wall of the base half 55 and the horizontal flat surface 171*c*. The first inclined flat surface 171*a* is oblique with respect to the horizontal, and faces the flange 14 of the drum core 6. The second inclined flat surface 171*b* is non-parallel to the first inclined flat surface 171*a*. The second inclined flat surface 171*b* extends between the horizontal flat surface 171*c* and the projection 60 on the base half 55. The second inclined flat surface 171*b* is oblique with respect to the horizontal, and faces the flange 14 of the drum core 6. The angle of the second inclined flat surface 171*b* relative to the vertical is different from that of the first inclined flat surface 171*a*. The horizontal flat surface 171*c* connects the first and second inclined flat surfaces 171*a* and 171*b*.

Similarly, the hold portion 171 for the flange 16 of the drum core 7 has a first inclined flat surface 171*a*, a second inclined flat surface 171*b*, and a horizontal flat surface 171*c*. The first inclined flat surface 171*a* extends between the lower end of the side wall of the base half 55 and the horizontal flat surface 171*c*. The first inclined flat surface 171*a* is oblique with respect to the horizontal, and faces the flange 16 of the drum core 7. The second inclined flat surface 171*b* is non-parallel to the first inclined flat surface 171*a*. The second inclined flat surface 171*b* extends between the horizontal flat surface 171*c* and the projection 60 on the base half 55. The second inclined flat surface 171*b* is oblique with respect to the horizontal, and faces the flange 16 of the drum core 7. The angle of the second inclined flat surface 171*b* relative to the vertical is different from that of the first inclined flat surface 171*a*. The horizontal flat surface 171*c* connects the first and second inclined flat surfaces 171*a* and 171*b*.

With reference to FIG. 13, regarding the hold portion 171 for the flange 14 of the drum core 6, the sides "de", "df", and "ef" of the triangle "def" correspond to the second inclined flat surface 171*b* of the hold portion 171, the first inclined flat surface 171*a*, and the straight line portion 62 of the lid half 53, respectively. The sides “de”, “df”, and “ef” of the triangle “def” are formed by extending the first and second inclined flat surfaces 171*a* and 171*b* of the hold portion 171, and the straight line portion 62 of the lid half 53. Since the flat surfaces 171*a* and 171*b* of the hold portion 171 have different inclination angles respectively, the triangle “def” is not isosceles. Thus, the angles “e” and “f” of the triangle “def” have different values “α1” and “α2” respectively.

Regarding the hold portion 171 for the flange 16 of the drum core 7, the sides “gh”, “gi”, and “hi” of the triangle “ghi” correspond to the first inclined flat surface 171*a* of the hold portion 171, the second inclined flat surface 171*b*, and the straight line portion 62 of the lid half 53, respectively. The sides “gh” and “gi” of the triangle “ghi” are formed by extending the first and second inclined flat surfaces 171*a* and 171*b* of the hold portion 171. Since the flat surfaces 171*a* and 171*b* of the hold portion 171 have different inclination angles respectively, the triangle “ghi” is not isosceles. Thus, the angles “h” and “i” of the triangle “ghi” have different values “α3” and “α4” respectively.

In FIG. 13, regarding the hold portion 171 for the flange 14 of the drum core 6, the flange 14 contacts the straight line portion 62 of the lid half 53 at a point P1. In addition, the flange 14 contacts the first inclined flat surface 171*a* at a point P2, and contacts the second inclined flat surface 171*b* at a point P3.

In FIG. 13, regarding the hold portion 171 for the flange 16 of the drum core 7, the flange 16 contacts the straight line portion 62 of the lid half 53 at a point P4. In addition, the flange 16 contacts the first inclined flat surface 171*a* at a point P6, and contacts the second inclined flat surface 171*b* at a point P5.

Third Embodiment

Figure 14:
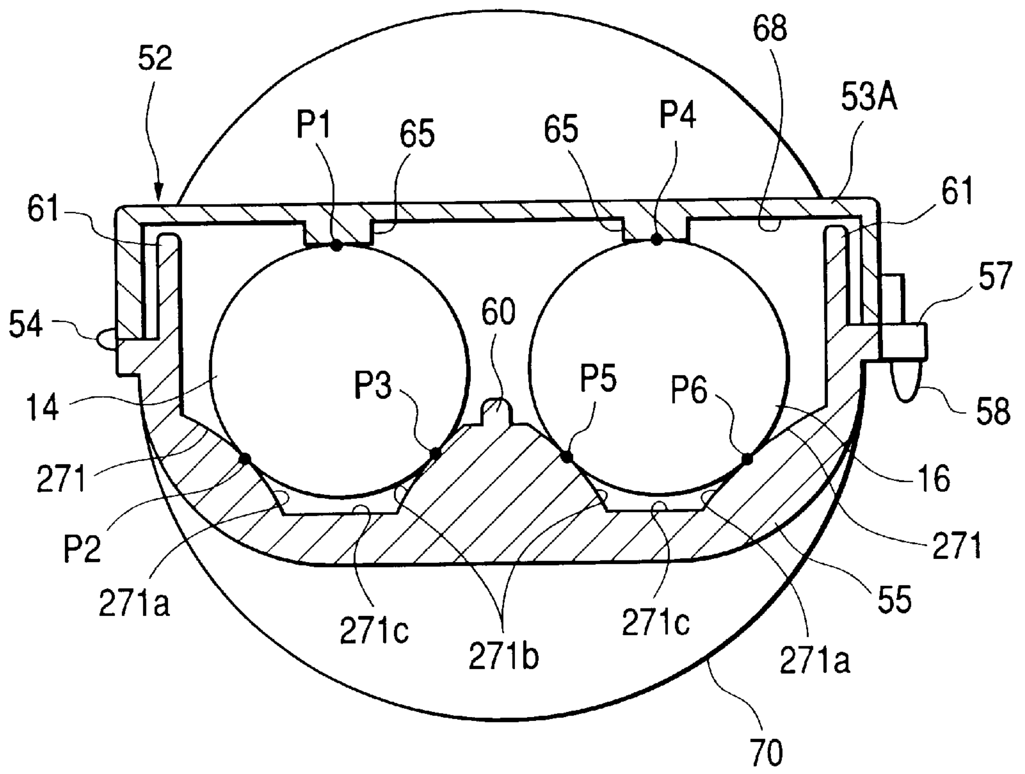
FIG. 14 is a sectional view of a mis-convergence correction device according to a third embodiment of this invention.

FIG. 14 shows a third embodiment of this invention which is similar to the embodiment of FIGS. 8–12 except for design changes explained hereinafter. The embodiment of FIG. 14 includes hold portions 271 which replace the hold portions 71 of the base half 55 of the coil retainer 52. In addition, the embodiment of FIG. 14 includes a lid half 53A instead of the lid half 53.

As shown in FIG. 14, the hold portion 271 for the flange 14 of the drum core 6 has a first inclined surface 271*a*, a second inclined surface 271*b*, and a horizontal flat surface 271*c*. The first inclined surface 271*a* is convexly curved. The first inclined surface 271*a* extends between the lower end of the side wall of the base half 55 and the horizontal flat surface 271*c*. The first inclined surface 271*a* is oblique with respect to the horizontal, and faces the flange 14 of the drum core 6. The second inclined surface 271*b* is convexly curved. The second inclined surface 271*b* extends between the horizontal flat surface 271*c* and the projection 60 on the base half 55. The second inclined surface 271*b* is oblique with respect to the horizontal, and faces the flange 14 of the drum core 6. The horizontal flat surface 271*c* connects the first and second inclined surfaces 271*a* and 271*b*. The shape of the hold portion 271 for the flange 14 of the drum core 6 is symmetrical with respect to the vertical passing through the center of the horizontal flat surface 271*c*. Thus, the first and second inclined surfaces 271*a* and 271*b* are separate from the previously-indicated vertical at equal average angles along opposite directions, respectively. In other words, the average angle of the second inclined surface 271*b* relative to the vertical is equal to that of the first inclined surface 271*a*.

Similarly, the hold portion 271 for the flange 16 of the drum core 7 has a first inclined surface 271*a*, a second inclined surface 271*b*, and a horizontal flat surface 271*c*. The first inclined surface 271*a* is convexly curved. The first inclined surface 271*a* extends between the lower end of the side wall of the base half 55 and the horizontal flat surface 271*c*. The first inclined surface 271*a* is oblique with respect to the horizontal, and faces the flange 16 of the drum core 7. The second inclined surface 271*b* is convexly curved. The second inclined surface 271*b* extends between the horizontal flat surface 271*c* and the projection 60 on the base half 55. The second inclined surface 271*b* is oblique with respect to the horizontal, and faces the flange 16 of the drum core 7. The horizontal flat surface 271*c* connects the first and second inclined surfaces 271*a* and 271*b*. The shape of the hold portion 271 for the flange 16 of the drum core 7 is symmetrical with respect to the vertical passing through the center of the horizontal flat surface 271*c*. Thus, the first and second inclined surfaces 271*a* and 271*b* are separate from the previously-indicated vertical at equal average angles along opposite directions, respectively. In other words, the average angle of the second inclined surface 271*b* relative to the vertical is equal to that of the first inclined surface 271*a*.

The inner surfaces of the lid half 53A have projections 65 which contact and press the tops of the flanges 14–21 of the drum cores 6–9 at points P1 and P4. Preferably, the projections 65 form straight line portions in contact with the flanges 14–21 of the drum cores 6–9. In this case, the projections 65 are equivalent in function to the straight line portions 62 in the embodiment of FIGS. 8–12.

In FIG. 14, regarding the hold portion 271 for the flange 14 of the drum core 6, the flange 14 contacts the projection 65 on the lid half 53A at the point P1. In addition, the flange 14 contacts the first inclined surface 271*a* of the hold portion 271 at a point P2, and contacts the second inclined surface 271*b* of the hold portion 271 at a point P3. Thus, in FIG. 14, the flange 14 of the drum core 6 is supported at three points angularly separate from each other.

In FIG. 14, regarding the hold portion 271 for the flange 16 of the drum core 7, the flange 16 contacts the projection 65 on the lid half 53A at the point P4. In addition, the flange 16 contacts the first inclined surface 271*a* of the hold portion 271 at a point P6, and contacts the second inclined surface 271*b* of the hold portion 271 at a point P5. Thus, in FIG. 14, the flange 16 of the drum core 7 is supported at three points angularly separate from each other.

Similarly, each of the other flanges 15, 17, 18, 19, 20, and 21 of the drum cores 6–9 is supported at three points angularly separate from each other as viewed in cross section. Thereby, the controlled coil units 1 and 2 are fixedly held in the spaces 68 within the coil retainer 52.

As the diameters of the flanges 14 and 16 of the drum cores 6 and 7 vary, the centers of the flanges 14 and 16 of the drum cores 6 and 7 move only along the vertical. Thus, as in the embodiment of FIGS. 8–12, the distance L1 between the axes of the drum cores 6 and 7 and the distance L2 between the axes of the drum cores 8 and 9 remain constant even when the diameters of the flanges 18, 19, 20, and 21 of the drum cores 8 and 9 vary.

Preferably, the width (the horizontal dimension) of the projections 65 is chosen so that the projections 65 can remain in contact with the tops of the flanges 14–21 of the drum cores 6–9 even when the lid half 53A shifts rightward relative to the base half 55 during the movement into its closed position.

The projections 65 on the lid half 53A may be replaced by straight line portions similar to the straight line portion 62 of the lid half 53 in the embodiment of FIGS. 8–12. The first and second inclined surfaces 271*a* and 271*b* of each of the hold portions 271 may be flat similarly to the first and second inclined flat surfaces 71*a* and 71*b* in the embodiment of FIGS. 8–12.

Fourth Embodiment

Figure 15:
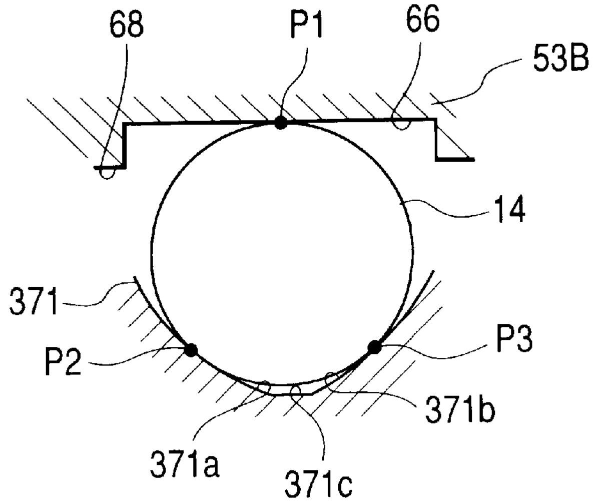
FIG. 15 is a sectional view of a portion of a mis-convergence correction device according to a fourth embodiment of this invention.

FIG. 15 shows a fourth embodiment of this invention which is similar to the embodiment of FIGS. 8–12 except for design changes explained hereinafter. The embodiment of FIG. 15 includes hold portions 371 which replace the hold portions 71 of the base half 55 of the coil retainer 52. In addition, the embodiment of FIG. 15 includes a lid half 53B instead of the lid half 53.

The hold portions 371 are similar in structure to each other. Accordingly, only the hold portion 371 for the flange 14 of the drum core 6 will be explained in detail hereinafter.

As shown in FIG. 15, the hold portion 371 for the flange 14 of the drum core 6 has a first inclined surface 371*a*, a second inclined surface 371*b*, and a horizontal flat surface 371*c*. The first inclined surface 371*a* is concavely curved. The first inclined surface 371*a* extends between the lower end of the side wall of the base half 55 and the horizontal flat surface 371*c*. The first inclined surface 371*a* is oblique with respect to the horizontal, and faces the flange 14 of the drum core 6. The second inclined surface 371*b* is concavely curved. The second inclined surface 371*b* extends between the horizontal flat surface 371*c* and the projection 60 on the base half 55. The second inclined surface 371*b* is oblique with respect to the horizontal, and faces the flange 14 of the drum core 6. The horizontal flat surface 371*c* connects the first and second inclined surfaces 371*a* and 371*b*. The shape of the hold portion 371 for the flange 14 of the drum core 6 is symmetrical with respect to the vertical passing through the center of the horizontal flat surface 371*c*. Thus, the first and second inclined surfaces 371*a* and 371*b* are separate from the previously-indicated vertical at equal average angles along opposite directions, respectively. In other words, the average angle of the second inclined surface 371*b* relative to the vertical is equal to that of the first inclined surface 371*a*.

The inner surfaces of the lid half 53B have recesses 66, the ceiling walls (the bottom walls) of which contact and press the tops of the flanges 14–21 of the drum cores 6–9 at points P1 and P4. It should be noted that FIG. 15 shows only one of the recesses 66. Preferably, the ceiling walls (the bottom walls) of the recesses 66 form straight line portions in contact with the flanges 14–21 of the drum cores 6–9. In this case, the ceiling walls (the bottom walls) of the recesses 66 are equivalent in function to the straight line portions 62 in the embodiment of FIGS. 8–12.

In FIG. 15, regarding the hold portion 371 for the flange 14 of the drum core 6, the flange 14 contacts the ceiling wall (the bottom wall) of the recess 66 in the lid half 53B at the point P1. In addition, the flange 14 contacts the first inclined surface 371*a* of the hold portion 371 at a point P2, and contacts the second inclined surface 371*b* of the hold portion 371 at a point P3. Thus, in FIG. 15, the flange 14 of the drum core 6 is supported at three points angularly separate from each other.

Similarly, each of the other flanges 15–21 of the drum cores 6–9 is supported at three points angularly separate from each other as viewed in cross section. Thereby, the controlled coil units 1 and 2 are fixedly held in the spaces 68 within the coil retainer 52.

As the diameters of the flanges 14–21 of the drum cores 6–9 vary, the centers of the flanges 14–21 of the drum cores 6–9 move only along the verticals. Thus, as in the embodiment of FIGS. 8–12, the distance L1 between the axes of the drum cores 6 and 7, and the distance L2 between the axes of the drum cores 8 and 9 remain constant even when the diameters of the flanges 14–21 of the drum cores 6–9 vary.

Preferably, the width or the horizontal dimension of the recesses 66 is chosen so that the ceiling walls (the bottom walls) of the recesses 66 can remain in contact with the tops of the flanges 14–21 of the drum cores 6–9 even when the lid half 53B shifts rightward relative to the base half 55 during the movement into its closed position.

The recesses 66 in the lid half 53B may be replaced by straight line portions similar to the straight line portion 62 of the lid half 53 in the embodiment of FIGS. 8–12. The first and second inclined surfaces 371*a* and 371*b* of each of the hold portions 371 may be flat similarly to the first and second inclined flat surfaces 71*a* and 71*b* in the embodiment of FIGS. 8–12.

It should be noted that the structure of the embodiment of FIG. 14 and the structure of the embodiment of FIG. 15 may be combined in a suitable way.

Fifth Embodiment

Figure 16:
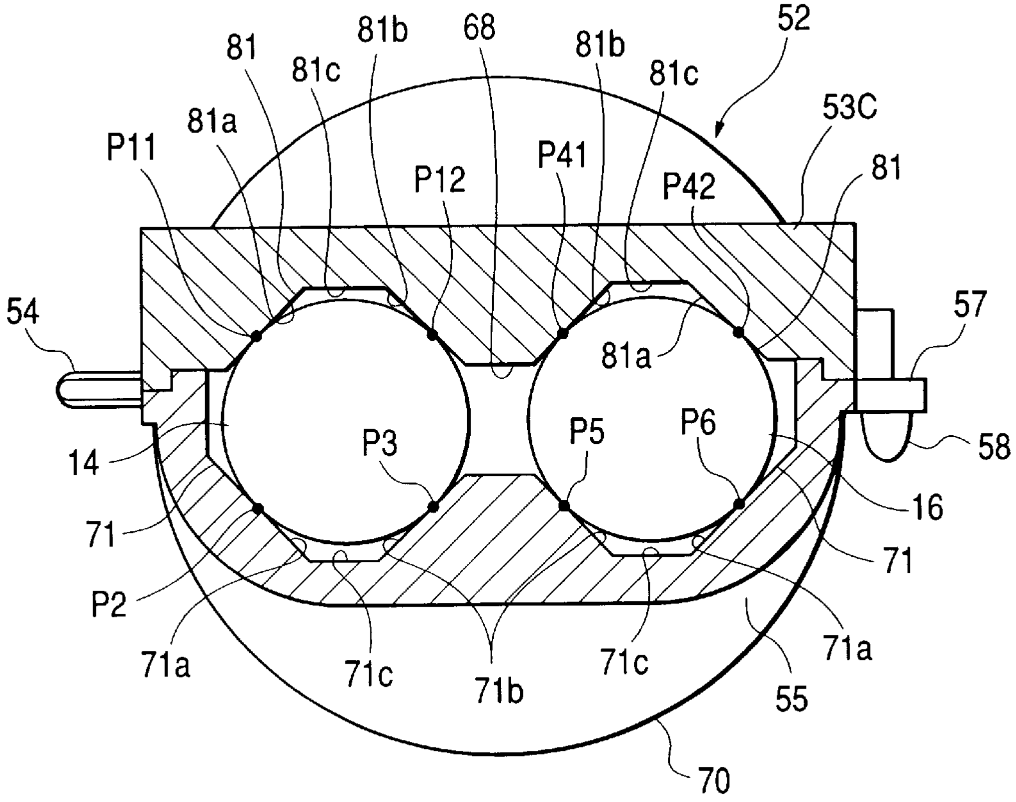
FIG. 16 is a sectional view of a mis-convergence correction device according to a fifth embodiment of this invention.

FIG. 16 shows a fifth embodiment of this invention which is similar to the embodiment of FIGS. 8–12 except for design changes explained hereinafter. The embodiment of FIG. 16 includes a lid half 53C instead of the lid half 53. The lid half 53C is made of elastic material.

The wall of the lid half 53C has hold portions 81 for retaining upper portions of the flanges 14–21 of the drum cores 6–9. The hold portions 81 face the interior of the coil retainer 52. The hold portions 81 of the lid half 53C are similar to each other. Among them, the hold portions 81 for the flanges 14 and 16 of the drum cores 6 and 7 will be explained in detail later.

When the lid half 53C is in its closed position relative to the base half 55 as shown in FIG. 16, the lid half 53C and the base half 55 form spaces 68 which accommodate the controlled coil units 1 and 2 respectively. As previously mentioned, the wall of the lid half 53C has the hold portions 81. The upper portions of the flanges 14–21 of the drum cores 6–9 are placed into and supported by the hold portions 81 of the lid half 53C, respectively. The lower portions of the flanges 14–21 of the drum cores 6–9 are placed on and supported by the hold portions 71 of the base half 55. Thus, the flanges 14–21 of the drum cores 6–9 are retained between the hold portions 71 of the base half 55 and the hold portions 81 of the lid half 53C.

With reference to FIG. 16, the hold portion 81 for the flange 14 of the drum core 6 has a first inclined flat surface 81*a*, a second inclined flat surface 81*b*, and a horizontal flat surface 81*c*. The first inclined flat surface 81*a* extends between the side wall of the lid half 53C and the horizontal flat surface 81*c*. The first inclined flat surface 81*a* is oblique with respect to the horizontal, and faces the flange 14 of the drum core 6. The second inclined flat surface 81*b* is non-parallel to the first inclined flat surface 81*a*. The second inclined flat surface 81*b* extends between the horizontal flat surface 81*c* and the central wall of the lid half 53C. The second inclined flat surface 81*b* is oblique with respect to the horizontal, and faces the flange 14 of the drum core 6. The horizontal flat surface 81*c* connects the first and second inclined flat surfaces 81*a* and 81*b*. The shape of the hold portion 81 for the flange 14 of the drum core 6 is symmetrical with respect to the vertical passing through the center of the horizontal flat surface 81*c*. Thus, the first and second inclined flat surfaces 81_a_ and 81_b_ are separate from the previously-indicated vertical by equal angles along opposite directions, respectively. In other words, the angle of the second inclined flat surface 81_b_ relative to the vertical is equal to that of the first inclined flat surface 81_a_.

Similarly, the hold portion 81 for the flange 16 of the drum core 7 has a first inclined flat surface 81_a_, a second inclined flat surface 81_b_, and a horizontal flat surface 81_c_. The first inclined flat surface 81_a_ extends between the side wall of the lid half 53C and the horizontal flat surface 81_c_. The first inclined flat surface 81_a_ is oblique with respect to the horizontal, and faces the flange 16 of the drum core 7. The second inclined flat surface 81_b_ extends between the horizontal flat surface 81_c_ and the central wall of the lid half 53C. The second inclined flat surface 81_b_ is oblique with respect to the horizontal, and faces the flange 16 of the drum core 7. The horizontal flat surface 81_c_ connects the first and second inclined flat surfaces 81_a_ and 81_b_. The shape of the hold portion 81 for the flange 16 of the drum core 7 is symmetrical with respect to the vertical passing through the center of the horizontal flat surface 81_c_. Thus, the first and second inclined flat surfaces 81_a_ and 81_b_ are separate from the previously-indicated vertical by equal angles along opposite directions, respectively. In other words, the angle of the second inclined flat surface 81_b_ relative to the vertical is equal to that of the first inclined flat surface 81_a_.

In FIG. 16, regarding the hold portions 71 and 81 for the flange 14 of the drum core 6, the flange 14 contacts the first inclined flat surface 71_a_ of the hold portion 71 at a point P2, and contacts the second inclined flat surface 71_b_ of the hold portion 71 at a point P3. In addition, the flange 14 contacts the first inclined flat surface 81_a_ of the hold portion 81 at a point P11, and contacts the second inclined flat surface 81_b_ of the hold portion 81 at a point P12. Thus, in FIG. 16, the flange 14 of the drum core 6 is supported at four points angularly separate from each other.

In FIG. 16, regarding the hold portions 71 and 81 for the flange 16 of the drum core 7, the flange 16 contacts the first inclined flat surface 71_a_ of the hold portion 71 at a point P6, and contacts the second inclined flat surface 71_b_ of the hold portion 71 at a point P5. In addition, the flange 16 contacts the first inclined flat surface 81_a_ of the hold portion 81 at a point P42, and contacts the second inclined flat surface 81_b_ of the hold portion 81 at a point P41. Thus, in FIG. 16, the flange 16 of the drum core 7 is supported at four points angularly separate from each other.

Similarly, each of the other flanges 15, 17, 18, 19, 20, and 21 of the drum cores 6–9 is supported at four points angularly separate from each other as viewed in cross section. Thereby, the controlled coil units 1 and 2 are fixedly held in the spaces 68 within the coil retainer 52.

Preferably, the hold portions 81 of the lid half 53C are designed so as to surely contact and press the upper portions of the flanges 14–21 of the drum cores 6–9 even in the presence of variations in the diameters of the flanges 14–21. In this case, the controlled coil units 1 and 2 which include the drum cores 6–9 are firmly retained in the spaces 68 within the coil holder 52 by the elasticity of the lid half 53C.

With reference to FIG. 16, the inner surfaces of the side walls of the lid half 53C are separate from each other by a first predetermined interval. The outer surfaces of the upper side walls of the base half 55 are separate from each other by a second predetermined interval substantially equal to the first predetermined interval. Therefore, as the lid half 53C is rotated to its closed position, the base half 55 relatively fits into the lid half 53C while the lid half 53C is prevented from shifting rightward relative to the base half 55.

Preferably, the hinge 54 which connects the lid half 53C and the base half 55 is long so that the lid half 53C can be moved onto the base half 55 along the vertical direction during assembly of the device. The hinge 54 may be omitted. In this case, the lid half 53C and the base half 55 are disconnected from each other, and the lid half 53C is placed on the base half 55 from above during assembly of the device.

The inclined flat surfaces 71_a_ and 71_b_ of the hold portions 71 may be replaced by inclined curved surfaces. The inclined flat surfaces 81_a_ and 81_b_ of the hold portions 81 may be replaced by inclined curved surfaces.

Sixth Embodiment

Figure 18:
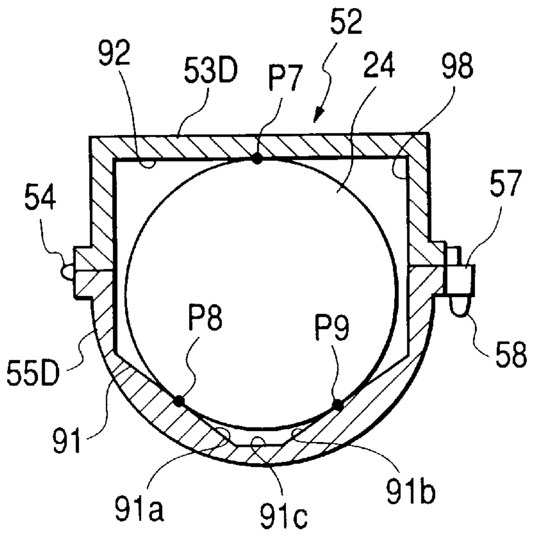
FIG. 18 is a sectional view of a mis-convergence correction device according to a sixth embodiment of this invention.

FIG. 18 shows a sixth embodiment of this invention which is similar to the embodiment of FIGS. 8–12 except for design changes explained hereinafter. The embodiment of FIG. 18 includes a lid half 53D instead of the lid half 53. In addition, the embodiment of FIG. 18 includes a base half 55D instead of the base half 55. The lid half 53D and the base half 55D are made of elastic material.

When the lid half 53D is in its closed position relative to the base half 55D as shown in FIG. 18, the lid half 53D and the base half 55D form a space 98 which accommodates the controlling coil unit 3. The bottom wall of the base half 55D has hold-portions 91 for retaining the flanges 24 and 25 of the drum core 22 in the controlling coil unit 3. The hold portions 91 of the base half 55D define the previously-indicated space 98. The flanges 24 and 25 of the drum core 22 are placed on and supported by the hold portions 91 of the base half 55D, respectively.

The inner surfaces of the lid half 53D of the coil holder 52 are formed with straight line portions 92 which are spaced along the longitudinal direction of the lid half 53D. The straight line portions 92 extend parallel to the widthwise direction of the lid half 53D. The straight line portions 92 have flat surfaces. The straight line portions 92 of the lid half 53D correspond in position to the hold portions 91 of the base half 55D, respectively. During assembly of the device, when the lid half 53D is rotated to its closed position, the straight line portions 92 of the lid half 53D contact and press the tops of the flanges 24 and 25 of the drum core 22 in the base half 55D. As previously mentioned, the flanges 24 and 25 of the drum core 22 are placed on and supported by the hold portions 91 of the base half 55D, respectively. Thus, the flanges 24 and 25 of the drum core 22 are retained between the hold portions 91 of the base half 55D and the straight line portions 92 of the lid half 53D.

The hold portions 91 of the base half 55D are similar in structure to each other. Accordingly, only the hold portion 91 for the flange 24 of the drum core 22 will be explained in detail hereinafter.

With reference to FIG. 18, the hold portion 91 for the flange 24 of the drum core 22 has a first inclined flat surface 91_a_, a second inclined flat surface 91_b_, and a horizontal flat surface 91_c_. The first inclined flat surface 91 a extends between the lower end of one side wall of the base half 55D and the horizontal flat surface 91_c_. The first inclined flat surface 91_a_ is oblique with respect to the horizontal, and faces the flange 24 of the drum core 22. The second inclined flat surface 91_b_ is non-parallel to the first inclined flat surface 91_a_. The second inclined flat surface 91_b_ extends between the horizontal flat surface 91_c_ and the lower end of the other side wall of the base half 55D. The second inclined flat surface 91_b_ is oblique with respect to the horizontal, and faces the flange 24 of the drum core 22. The horizontal flat surface 91c connects the first and second inclined flat surfaces 91a and 91b. The shape of the hold portion 91 for the flange 24 of the drum core 22 is symmetrical with respect to the vertical passing through the center of the horizontal flat surface 91c. Thus, the first and second inclined flat surfaces 91a and 91b are separate from the previously-indicated. vertical by equal angles along opposite directions, respectively. In other words, the angle of the second inclined flat surface 91b relative to the vertical is equal to that of the first inclined flat surface 91a.

In FIG. 18, regarding the hold portion 91 for the flange 24 of the drum core 22, the flange 24 contacts the straight line portion 92 of the lid half 53D at a point P7. In addition, the flange 24 contacts the first inclined flat surface 91a of the hold portion 91 at a point P8, and contacts the second inclined flat surface 91b of the hold portion 91 at a point P9. Thus, in FIG. 18, the flange 24 of the drum core 22 is supported at three points angularly separate from each other.

Similarly, the flange 25 of the drum core 22 is supported at three points angularly separate from each other as viewed in cross section. Thereby, the controlling coil unit 3 is fixedly held in the space 98 within the coil retainer 52.

As understood from the previous explanation, the horizontal flat surfaces 91c of the hold portions 91 do not affect the positioning of the flanges 24 and 25 of the drum core 22. Accordingly, the horizontal flat surfaces 91c of the hold portions 91 may be replaced by non-flat surfaces. Alternatively, the horizontal flat surfaces 91c of the hold portions 91 may be omitted. In this case, the hold portions 91 have V-shaped structures.

Preferably, the straight line portions 92 of the lid half 53D are designed so as to surely contact and press the tops of the flanges 24 and 25 of the drum core 22 even in the presence of variations in the diameters of the flanges 24 and 25. In this case, the controlling coil unit 3 which includes the drum core 22 is firmly retained in the space 98 within the coil holder 52 by the elasticity of the lid half 53D.

The hold portions 91 of the base half 55D enable the controlling coil unit 3 to be accurately positioned within the coil holder 52. Thus, it is possible to provide a correct positional relation among the controlled coil units 1 and 2, and the controlling coil unit 3. The correct positional relation results in good characteristics of the mis-convergence correction device.

The hold portions 91 of the base half 55D and the straight line portions 92 of the lid half 53D enable the controlling coil unit 3 to be firmly retained within the coil holder 52. Thus, it is possible to prevent the controlling coil unit 3 from vibrating and generating noise sound during the activation of the device.

The inclined flat surfaces 91a and 91b of the hold portions 91 may be replaced by inclined curved surfaces. The lid half 53D may be modified to support each of the flanges 24 and 25 of the drum core 22 at two points angularly separate from each other as viewed in cross section.

The embodiment of FIG. 18 may be combined with one of the embodiments of FIGS. 8–17.

Seventh Embodiment

A seventh embodiment of this invention is a modification of one of the embodiments of FIGS. 8–18. A mis-convergence correction device according to the seventh embodiment of this invention includes a first controlled coil unit, a second controlled coil unit, a controlling coil unit, and a coil holder.

The first controlled coil unit includes at least a first drum core and at least a first winding. The first drum core has circular flanges at its opposite ends respectively. The first winding is provided on a portion of the first drum core between its flanges.

The second controlled coil unit includes at least a second drum core and at least a second winding. The second drum core has circular flanges at its opposite ends respectively. The second winding is provided on a portion of the second drum core between its flanges.

The controlling coil unit is located between the first and second controlled coil units. The controlling coil unit includes a third drum core and a controlling coil. The third drum core has circular flanges at its opposite ends respectively. The controlling coil is provided on a portion of the third drum core between its flanges.

The coil holder accommodates the first and second controlled coil units and the controlling coil unit. The coil holder has first and second halves. The first half has a hold portion for each of the flanges of the first and second drum cores. The hold portion has first and second inclined surfaces being non-parallel to each other. The first inclined surface contacts the related flange only at a first point as viewed in a cross-section of the related flange. The second inclined surface contacts the related flange only at a second point as viewed in the cross-section of the related flange. The first and second points are separate from each other.

What is claimed is:

1. A mis-convergence correction device comprising:

a first controlled coil unit including first and second drum cores and first and second windings, the first drum core having circular flanges at its opposite ends respectively, the second drum core having circular flanges at its opposite ends respectively, the first winding being provided on a portion of the first drum core between its flanges, the second winding being provided on a portion of the second drum core between its flanges, the first and second windings being connected to form a first controlled coil;

a second controlled coil unit including third and fourth drum cores and third and fourth windings, the third drum core having circular flanges at its opposite ends respectively, the fourth drum core having circular flanges at its opposite ends respectively, the third winding being provided on a portion of the third drum core between its flanges, the fourth winding being provided on a portion of the fourth drum core between its flanges, the third and fourth windings being connected to form a second controlled coil;

a controlling coil unit located between the first and second controlled coil units, the controlling coil unit including a fifth drum core and a controlling coil, the fifth drum core having circular flanges at its opposite ends respectively, the controlling coil being provided on a portion of the fifth drum core between its flanges; and a coil holder accommodating the first and second controlled coil units and the controlling coil unit, the coil holder having first and second halves; the first half having a hold portion for each of the flanges of the first, second, third and fourth drum cores, the hold portion having first and second inclined surfaces non-parallel to each other, the first inclined surface contacting the related flange only at a first point as viewed in a cross-section of the related flange, the second inclined surface contacting the related flange only at a second point as viewed in the cross-section of the related flange, the first and second points being separate from each other; said first and second inclined surfaces and related flanges being positioned so that a straight line perpendicular to the first inclined surface passing through the first point, and a straight line perpendicular to the second inclined surface passing through the second point intersect with each other at a center of the related flange.

2. A mis-convergence correction device as recited in claim 1, wherein the second half has a surface for each of the flanges of the first, second, third, and fourth drum cores, and the surface of the second half contacts the related flange only at a single point as viewed in the cross-section of the related flange.

3. A mis-convergence correction device as recited in claim 1, wherein the first half has a second hold portion for each of the flanges of the fifth drum core, the second hold portion having third and fourth inclined surfaces being non-parallel to each other, the third inclined surface contacting the related flange only at a third point as viewed in a cross-section of the related flange, the fourth inclined surface contacting the related flange only at a fourth point as viewed in the cross-section of the related flange, the third and fourth points being separate from each other.

4. A mis-convergence correction device comprising:

a core having a flange;

a coil provided on a portion of the core except the flange; and a casing accommodating the core and the coil, the casing having first and second flat surfaces being non-parallel to each other, the first and second flat surfaces contacting the flange to support the core, wherein a combination of the core and the first and second flat surfaces is symmetrical with respect to an assumed plane passing through a center of the flange.

5. A mis-convergence correction device comprising:

a first controlled coil unit including at least a first drum core and at least a first winding, the first drum core having circular flanges at its opposite ends respectively, the first winding being provided on a portion of the first drum core between its flanges;

a second controlled coil unit including at least a second drum core and at least a second winding, the second drum core having circular flanges at its opposite ends respectively, the second winding being provided on a portion of the second drum core between its flanges;

a controlling coil unit located between the first and second controlled coil units, the controlling coil unit including a third drum core and a controlling coil, the third drum core having circular flanges at its opposite ends respectively, the controlling coil being provided on a portion of the third drum core between its flanges; and a coil holder accommodating the first and second controlled coil units and the controlling coil unit, the coil holder having first and second halves, the first half having a hold portion for each of the flanges of the first and second drum cores, the hold portion having first and second inclined surfaces being non-parallel to each other, the first inclined surface contacting the related flange only at a first point as viewed in a cross-section of the related flange, the second inclined surface contacting the related flange only at a second point as viewed in the cross-section of the related flange, the first and second points being separate from each other, said inclined surfaces and related flanges positioned so that a straight line perpendicular to the first inclined surface passing through the first point, and a straight line perpendicular to the second inclined surface passing through the second point intersect with each other at a center of the related flange.

6. A mis-convergence correction device comprising:

a first controlled coil unit including at least a first drum core and at least a first winding, the first drum core having circular flanges at its opposite ends respectively, the first winding being provided on a portion of the first drum core between its flanges;

a second controlled coil unit including at least a second drum core and at least a second winding, the second drum core having circular flanges at its opposite ends respectively, the second winding being provided on a portion of the second drum core between its flanges;

a controlling coil unit located between the first and second controlled coil units, the controlling unit including a third drum core and a controlling coil, the third drum core having circular flanges at its opposite ends respectively, the controlling coil being provided on a portion of the third drum core between its flanges; and a coil holder accommodating the first and second controlled coil units and the controlling coil unit, the coil holder having first and second halves, the first half having a hold portion for each of the flanges of the first and second drum cores, the hold portion having first and second inclined surfaces being non-parallel to each other, the first inclined surface contacting the related flange only at a first point as viewed in a cross-section of the related flange, the second inclined surface contacting the related flange only at a second point as viewed in the cross-section of the related flange, the first and second points being separate from each other;

wherein a combination of the first drum core and the first and second inclined surfaces is symmetrical with respect to an assumed plane passing through a center of the related flange, and wherein a combination of the second drum core and the first and second inclined surfaces is symmetrical with respect to an assumed plane passing through a center of the related flange.

7. A mis-convergence correction device comprising:

a core having a flange;

a coil provided on a portion of the core except the flange; and a casing accommodating the core and the coil, the casing having first and second inclined surfaces being non-parallel to each other, the first inclined surface contacting the flange at a point as viewed in a cross-section of the flange to support the core, the second inclined surface contacting the flange at a second point as viewed in the cross-section of the flange to support the core;

said inclined surfaces and flange positioned so that a straight line perpendicular to the first inclined surface passing through the first point, and a straight line perpendicular to the second inclined surface passing through the second point intersect with each other at a center of the flange.

* * * * *